US012706099B2

(12) United States Patent
Shi et al.

(10) Patent No.: US 12,706,099 B2
(45) Date of Patent: Aug. 11, 2026

(54) AUDIO RENDERING SYSTEM AND METHOD AND ELECTRONIC DEVICE

(71) Applicant: BEIJING ZITIAO NETWORK TECHNOLOGY CO., LTD., Beijing (CN)

(72) Inventors: Junjie Shi, Beijing (CN); Chuanzeng Huang, Beijing (CN); Xuzhou Ye, Beijing (CN); Zhengpu Zhang, Beijing (CN); Derong Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 290 days.

(21) Appl. No.: 18/541,665

(22) Filed: Dec. 15, 2023

(65) Prior Publication Data

US 2024/0119946 A1 Apr. 11, 2024

Related U.S. Application Data

(63) Continuation of application No. PCT/CN2022/098882, filed on Jun. 15, 2022.

(30) Foreign Application Priority Data

Jun. 15, 2021 (WO) ................ PCT/CN2021/100076

(51) Int. Cl.
*G10L 19/00* (2013.01)

(52) U.S. Cl.
CPC .................................... *G10L 19/00* (2013.01)

(58) Field of Classification Search
CPC ....... G10L 15/16; G10L 15/063; G10L 15/22; G10L 19/00; G10L 19/008; G10L 19/18; G06N 3/044; G06N 3/08; H04S 5/00
See application file for complete search history.

(56) References Cited

U.S. PATENT DOCUMENTS

| | | | |
|---|---|---|---|
| 2016/0133267 A1 | 5/2016 | Adami et al. | |
| 2018/0124540 A1 | 5/2018 | Skoglund et al. | |

(Continued)

FOREIGN PATENT DOCUMENTS

| | | | |
|---|---|---|---|
| CA | 3091529 A1 * | 8/2019 | ........... G10L 19/008 |
| CN | 102823277 A | 12/2012 | |

(Continued)

OTHER PUBLICATIONS

Office Action for Chinese Patent Application No. 202280042880.1, mailed Jul. 9, 2024, 22 pages.

(Continued)

*Primary Examiner* — Mohammad K Islam
(74) *Attorney, Agent, or Firm* — Astute IP Law Group

(57) ABSTRACT

The present invention relates to an audio rendering system and method and an electronic apparatus. The audio rendering system comprises: an audio signal encoding module, configured to for an audio signal in a specific audio content format, performing spatial encoding on the audio signal in the specific audio content format on the basis of metadata related information associated with the audio signal in the specific audio content format to obtain an encoded audio signal; and an audio signal decoding module, configured to performing spatial decoding on the encoded audio signal to obtain a decoded audio signal for audio rendering.

18 Claims, 12 Drawing Sheets

(56) References Cited

U.S. PATENT DOCUMENTS

| | | | | |
|---|---|---|---|---|
| 2018/0220255 | A1 | 8/2018 | Kim et al. | |
| 2019/0139555 | A1 | 5/2019 | Batke et al. | |
| 2020/0120438 | A1 | 4/2020 | Kim et al. | |
| 2021/0343300 | A1 * | 11/2021 | Küch | G10L 19/008 |

FOREIGN PATENT DOCUMENTS

| | | | | |
|---|---|---|---|---|
| CN | 103650539 | A | 3/2014 | |
| CN | 106210990 | A | 12/2016 | |
| CN | 109804645 | A | 5/2019 | |
| CN | 111955020 | A | 11/2020 | |
| CN | 117546236 | A * | 2/2024 | H04S 5/00 |
| GB | 2615607 | A * | 8/2023 | G10L 19/167 |
| JP | 7441057 | B2 * | 2/2024 | |
| TW | 201528254 | A * | 7/2015 | H04S 3/008 |
| WO | 2013/006338 | A2 | 1/2013 | |
| WO | 2019/197349 | A1 | 10/2019 | |
| WO | WO-2021074007 | A1 * | 4/2021 | G10L 19/167 |
| WO | WO-2022225555 | A1 * | 10/2022 | G10L 19/008 |

OTHER PUBLICATIONS

International Search Report, International Patent Application No. PCT/CN2022/098882, Sep. 16, 2022, with English translation (6 pages).

Second Office Action for Chinese Application No. 202280042880.1, mailed on Nov. 4, 2024, 16 pages.

Written Opinion for International Application No. PCT/CN2022/098882, mailed on Sep. 16, 2022, 9 Pages.

Notice of Allowance received for Chinese Patent Application No. 202280042880.1, mailed on Feb. 7, 2025, 8 pages (4 pages of English Translation and 4 pages of Original Document).

* cited by examiner

AUDIO RENDERING SYSTEM AND METHOD AND ELECTRONIC DEVICE

CROSS-REFERENCE OF RELATED APPLICATION

This application is a continuation of International Application No. PCT/CN2022/098882, filed on Jun. 15, 2022, which is based on and claims the benefit of an international patent application with application number PCT/CN2021/100076 filed on Jun. 15, 2021, the disclosures of both of the aforementioned applications are hereby incorporated into this disclosure by reference in their entireties.

FIELD OF THE INVENTION

The present disclosure relates to the technical field of audio signal processing, and in particular to an audio rendering system, an audio rendering method, electronic apparatus and a non-transitory computer-readable storage medium.

BACKGROUND

Audio rendering refers to proper processing of sound signals from a sound source to provide a user with a desired listening experience, especially an immersive experience, in the user application scenario.

Generally speaking, an excellent immersive audio system should provide listeners with the feeling of being immersed in a virtual environment. However, immersive sense itself is not a sufficient condition for successful commercial deployment of virtual reality multimedia services. In order to succeed in business, an audio system should also provide content creation tools, content creation workflows, content distribution modes and platforms, and a set of rendering systems that are economically viable and easy to use for consumers and creators.

For successful commercial deployment, whether an audio system is practical and economically viable depends on a usage scenario and the expected fineness of the usage scenario in the process of content production and consumption. For example, User Generated Content (UGC) and Professional Generated Content (PGC) will have very different expectations for a whole creation and consumption link and the experience of content playback. For example, an ordinary leisure-oriented user and a professional user will have very different requirements for the quality of content and the immersivity provided during playback, meanwhile, they will also have different playback apparatuses, for example, professional users may build a more elaborate listening environment.

DISCLOSURE OF THE INVENTION

According to some embodiments of the present disclosure, there is provided an audio rendering system, including an audio signal encoding module configured to spatially encode an audio signal in a specific audio content format based on information related to metadata associated with the audio signal in the specific audio content format to obtain an encoded audio signal; and an audio signal decoding module configured to spatially decode the encoded audio signal to obtain a decoded audio signal for audio rendering.

According to other embodiments of the present disclosure, there is provided an audio rendering method, including an audio signal encoding step for spatially encoding an audio signal in a specific audio content format based on information related to metadata associated with the audio signal in the specific audio content format to obtain an encoded audio signal; and an audio signal decoding step for spatially decoding the encoded audio signal to obtain a decoded audio signal for audio rendering.

According to still other embodiments of the present disclosure, there is provided a chip including at least one processor and an interface, wherein the interface is used for providing computer-executable instructions for the at least one processor, and the at least one processor is used for executing the computer-executable instructions to implement the audio rendering method of any embodiment described in the present disclosure.

According to still other embodiments of the present disclosure, there is provided a computer program including instructions that, when executed by a processor, cause the processor to perform the audio rendering method of any embodiment described in the present disclosure.

According to still further embodiments of the present disclosure, there is provided an electronic apparatus including a memory; and a processor coupled to the memory, the processor can be configured to execute instructions stored in the memory so as to execute the audio rendering method of any embodiment described in the present disclosure.

According to still further embodiments of the present disclosure, there is provided a computer-readable storage medium, on which a computer program is stored, the computer program, when executed by a processor, causes implementation of the audio rendering method of any embodiment described in the present disclosure.

According to still further embodiments of the present disclosure, there is provided a computer program product including instructions which, when executed by a processor, implement the audio rendering method of any embodiment described in the present disclosure.

Other features and advantages of the present disclosure will become clear from the following detailed description of exemplary embodiments of the present disclosure with reference to the accompanying drawings.

DESCRIPTION OF THE DRAWINGS

The accompanying drawings described herein are used to provide a further understanding of the present disclosure and constitute a part of the present disclosure. The illustrative embodiments of the present disclosure and their descriptions are used to explain the present disclosure and do not constitute undue limitations on the present disclosure. In the attached drawings.

Figure 1:
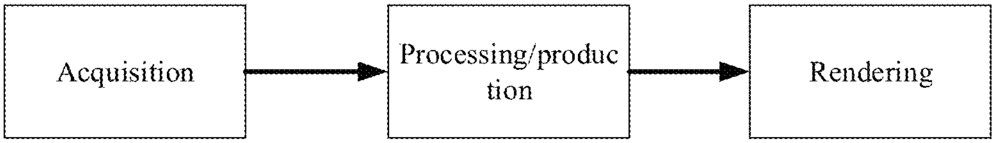
FIG. 1 shows a schematic diagram of some embodiments of an audio signal processing process.

It should be understood that for the convenience of description, the dimensions of various components shown in the drawings are not necessarily drawn according to the actual scale relationship. The same or similar reference numerals are used in the drawings to indicate the same or similar components. Therefore, once an item is defined in one figure, it may not be discussed further in subsequent figures.

DETAILED DESCRIPTION OF PREFERRED EMBODIMENTS

In the following, the technical schemes according to embodiments of the disclosure will be clearly and completely described with reference to the attached drawings, obviously, the described embodiments are only a part of the embodiments of the disclosure, but not all the embodiments. The following description of at least one exemplary embodiment is merely illustrative in nature and is in no way intended to limit the present disclosure, its application or usage. Based on the embodiments in the present disclosure, all other embodiments obtained by those ordinary skilled in this field without creative work belong to the protection scope of this disclosure.

Unless otherwise specified, the relative arrangement of components and steps, numerical expressions and numerical values set forth in these embodiments do not limit the scope of the present disclosure. Techniques, methods and apparatuses known to those ordinary skilled in the relevant fields may not be discussed in detail, but in appropriate cases, they should be regarded as part of the authorized specification. In all examples shown and discussed herein, any specific values should be interpreted as being illustrative only, instead of being limitative. Therefore, other examples of exemplary embodiments may have different values.

It should be understood that the steps described in the method embodiments of the present disclosure may be performed in a different order and/or in parallel. Furthermore, method embodiments may include additional steps and/or omit performing the illustrated steps. The scope of the present disclosure is not limited in this respect. Unless otherwise specified, the relative arrangement of components and steps, numerical expressions and numerical values set forth in these embodiments should be interpreted as merely exemplary, without limiting the scope of the present disclosure.

The term “including” and its variants used in this disclosure means an open term including at least the following elements/features, but not excluding other elements/features, that is, “including but not limited to”. In addition, the term “comprising” and its variants used in this disclosure mean an open term comprising at least the elements/features behind it, but not excluding other elements/features, that is, “comprising but not limited to”. Therefore, including is synonymous with comprising. The term “based on” means “at least partially based on”.

Reference throughout this specification to “one embodiment”, “some embodiments” or “embodiments” means that a particular feature, structure or characteristic described in connection with an embodiment also can be included in at least one embodiment of the present invention. For example, the term “one embodiment” means “at least one embodiment”; the term “another embodiment” means “at least one other embodiment”; the term “some embodiments” means “at least some embodiments”. Moreover, the appearances of the phrases “in one embodiment”, “in some embodiments” or “in an embodiment” in various places throughout the specification do not necessarily all refer to the same embodiment, but they may also refer to the same embodiment.

It should be noted that the concepts of “first” and “second” mentioned in this disclosure are only used to distinguish different apparatuses, modules or units, and are not used to limit the order or interdependence of the functions performed by these apparatuses, modules or units. Unless otherwise specified, the concepts of “first” and “second” are not intended to imply that the objects so described must be in a given order in time, space, ranking or in any other way.

It should be noted that the modifications of “a” and “a plurality” mentioned in this disclosure are schematic rather than limiting, and those skilled in the art should understand that unless the context clearly indicates, otherwise, they should be understood as “one or more”.

FIG. 1 shows some conceptual diagrams of audio signal processing, especially from acquisition to rendering process/system. As shown in FIG. 1, in this system, the audio signal, after being collected, can be processed or produced, and then the processed/produced audio signal can be distributed to a rendering end for rendering, so that it can be presented to the user in an appropriate form to satisfy the user experience. It should be pointed out that such an audio signal processing flow can be applied to various application scenarios, especially virtual reality audio content expression.

In particular, according to the embodiment of the present disclosure, virtual reality audio content expression generally relates to metadata, renderer/rendering system, audio codec and the like, wherein the metadata, renderer/rendering system and audio codec can be logically separated from each other. During local storage and production, the renderer/rendering system can directly process metadata and audio signals, without audio coding and decoding, in particular, the renderer/rendering system here can be used for audio content production. On the other hand, in the case of transmission (such as live broadcast or bidirectional communication), the transmission format of metadata+audio stream can be set, and then the metadata and audio content can be transmitted to the renderer/rendering system through an intermediate process including encoding and decoding process, so as to be rendered to users. In some embodiments, such as an exemplary embodiment of virtual reality audio content expression, input audio signal and metadata can be obtained from an acquisition end, wherein the input audio signal may include various appropriate forms, including, for example, channel, object, HOA or their mixed formats. Metadata can include appropriate types, such as dynamic metadata and static metadata, in which dynamic metadata can be transmitted together with input audio signals, for example, in various appropriate ways, as an example, metadata information can be generated according to metadata definitions, in which dynamic metadata can be transmitted along with audio streams, and the specific package format can be defined according to the transmission protocol type adopted by the system layer. Of course, metadata can also be directly transmitted to the playback end without further generating metadata information. For example, static metadata can be directly transmitted to the playback end, without going through the encoding and decoding process. In the transmission process, the input audio signal will be encoded, then transmitted to the playback end, and then decoded for playbacking to the user through a playback apparatus, such as a renderer. At the playback end, the renderer renders and outputs the decoded audio file. Logically, metadata and audio codec are independent from each other, and the decoder and renderer are decoupled therebetween. The renderer can be configured with an identifier, that is, a renderer has a corresponding identifier, and different renderers may have different identifiers. As an example, a registration mechanism is adopted for the renderer, that is, the playback end is provided with multiple IDs, which respectively indicate various renderers/rendering systems that the playback end can support, for example, it may include at least four IDs, ID1 indicates a renderer based on binaural output, ID2 indicates a renderer based on speaker output, ID3-ID4 indicate other types of renderers, and various renderers may indicate the same metadata definition, of course they may also support different metadata definitions, each renderer can have a corresponding metadata definition, in this case, a specific metadata identifier can be used to indicate a specific metadata definition in the transmission process, so that a renderer can have a corresponding metadata identifier, so that a corresponding renderer can be selected according to the metadata identifier for audio signal playback at the playback end.

Figure 2A:
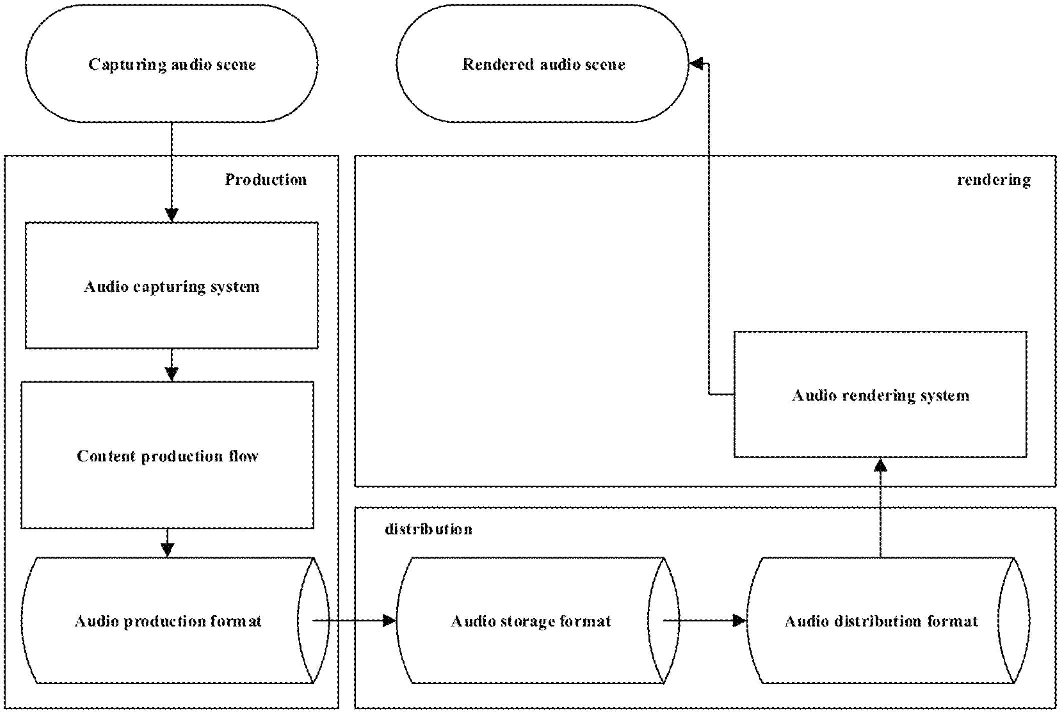
FIGS. 2A and 2B show schematic diagrams of some embodiments of the audio system architecture.
Figure 2B:
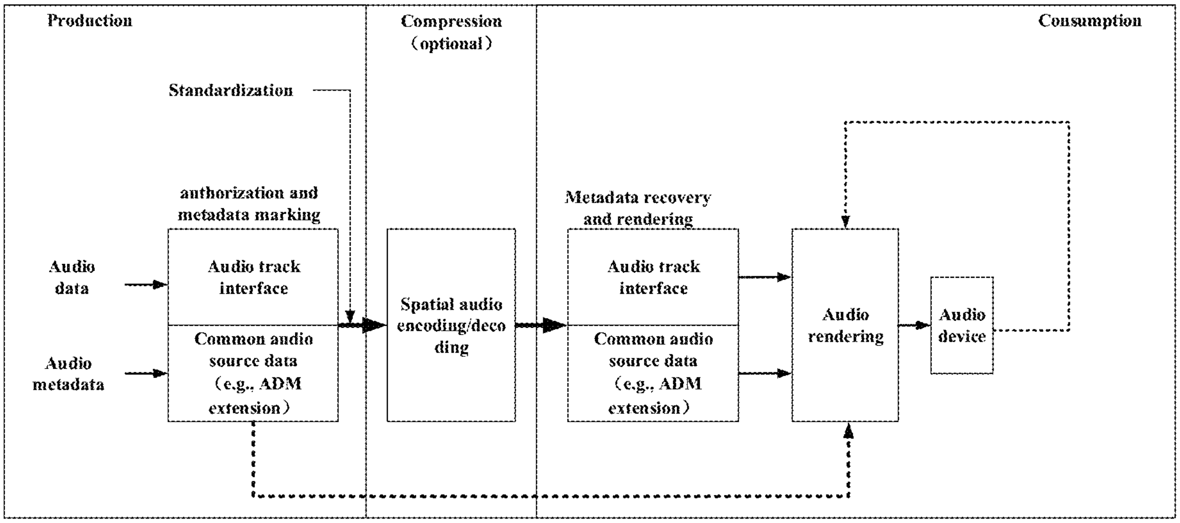

FIGS. 2A and 2B show exemplary implementations of an audio system. FIG. 2A shows a schematic diagram of an exemplary architecture of an audio system according to some embodiments of the present disclosure. As shown in FIG. 2A, an audio system may include, but not limited to, audio acquisition, audio content production, audio storage/distribution, and audio rendering. FIG. 2B shows exemplary implementations of various stages of an audio rendering process/system. Among them, the production and consumption stages in the audio system are mainly shown, and an intermediate processing stage, such as compression, can be optionally included. The production and consumption stages here may correspond to the exemplary implementations of the production and rendering stages shown in FIG. 2A, respectively. This intermediate processing stage can be included in the distribution stage shown in FIG. 2A, and can, of course, be included in the production stage and the rendering stage. The implementation of each part in the audio system will be described below with reference to FIGS. 2A and 2B. It should be pointed out that in addition to consideration of the complexity of collection, production, distribution and rendering, for an audio scene to support communication, the audio system may need to meet other requirements, such as delay, and such requirements can be met by corresponding processing means, which will not be described in detail here.

Audio Acquisition

In the audio acquisition stage, audio scenes will be captured to acquire audio signals. Audio acquisition can be dealt with by appropriate audio acquisition means/systems/apparatuses, etc.

The audio acquisition system can be closely relevant to the format used in the audio content production, audio content formats can include at least one of the following three: scene-based audio representation, channel-based audio representation and object-based audio representation, and for each audio content format, corresponding or matching apparatuses and/or manners can be adopted for capturing. As an example, for applications supporting the scene-based audio representation, a microphone array supporting a sphere configuration can be used to capture scene audio signals, while for applications using channel-based audio and object-based audio representations, one or more microphones that have been specially optimized can be used to record sound to capture audio signals. Additionally, audio acquisition may also include appropriate post-processing for the captured audio signals. Audio acquisition of various audio content formats will be exemplarily described below.

Acquisition of Scene-Based Audio Representation

Scene-based audio representation is a type of sound field representation which is extensible and independent of speakers, for example, an example definition is given in ITU R BS.2266-2. According to some embodiments, the scene-based audio may be based on a set of orthogonal basis functions, such as spherical harmonics.

According to some embodiments, examples of scene-based audio formats used may include B-Format, First Order Ambisonics (FOA), High Order Ambisonics (HOA) and the like. Ambisonics indicates an omnidirectional audio system, that is, it can include sound sources above and below the listener in addition to the horizontal plane. The auditory scene of Ambisonics can be captured by using a first-order or higher-order Ambisonics microphone. As an example, a scene-based audio representation may generally indicate an audio signal including HOA.

Figure 3A:
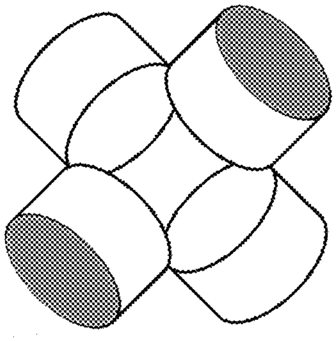
FIG. 3A shows a schematic diagram of a tetrahedral B-format microphone.

According to some embodiments, the B-format microphone or First Order Ambisonics (FOA) format may use the first four low-order spherical harmonics to represent a three-dimensional sound field with four signals W, X, Y and Z. Among them, W is used to record the omnidirectional sound pressure, X is used to record the front/back sound pressure gradient at the acquisition position, Y is used to record the left/right sound pressure gradient at the acquisition position, and Z is used to record the up/down sound pressure gradient at the acquisition position. Such four signals can be generated by processing original signals of a so-called "tetrahedron" microphone. The "tetrahedron" microphone can be composed of four microphones, which are arranged in left front upper (LFU), right front lower (RFD), left rear lower (LBD) and right rear upper (RBU), as shown in FIG. 3A.

In some embodiments, the B-format microphone array configuration can be deployed on a portable spherical audio and video acquisition apparatus, and original microphone signal components can be processed in real time to obtain W, X, Y and Z components. According to some examples, Horizontal only B-format microphones can be used to capture auditory scenes and acquire audio. In particular, some configurations may support only horizontal B-format, in which only W, X and Y components are captured while no Z component is captured. Compared with the 3D audio functionality of FOA and HOA, Horizontal only B-format gives up the extra immersion provided by height information.

Figure 3B:
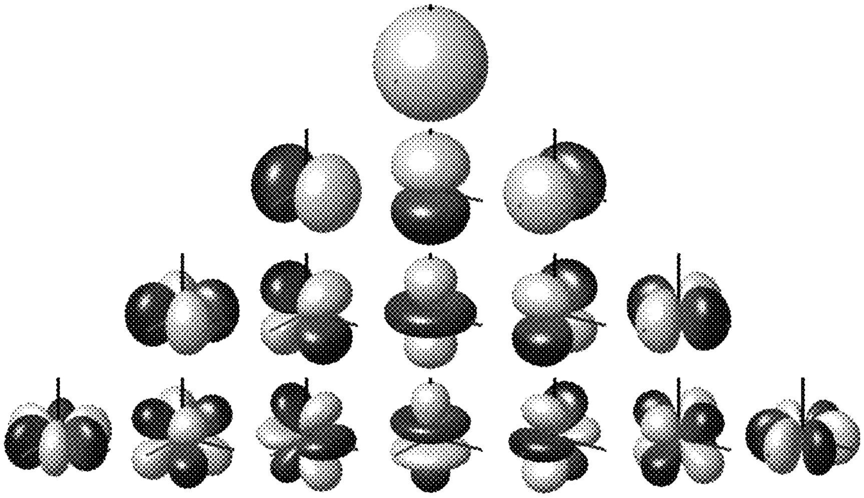
FIG. 3B shows a schematic diagram of spherical harmonics functions of order N=0 (first row) to order 3 (last row)
Figure 3C:
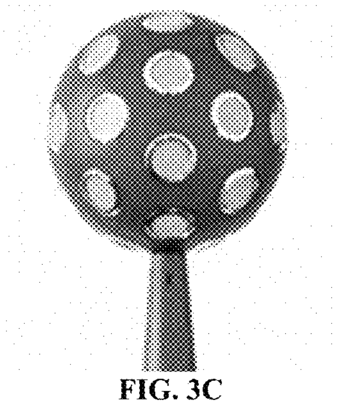
FIG. 3C shows a schematic diagram of a HOA microphone.

In some embodiments, multiple formats for High-Order Ambisonics data exchange may be included. In the HOA data exchange format, the channel order, normalization and polarity of channels should be correctly defined. In some embodiments, for HOA signals, auditory scenes can be captured by High-Order Ambisonics microphones. Especially, compared with the First-Order Ambisonics, the spatial resolution and listening area can be greatly enhanced by increasing the number of directional microphones, which can be realized by, for example, second-order, third-order, fourth-order, and higher-order Ambisonics systems (collectively referred to as HOA, Higher Order Ambisonics). An N-order three-dimensional Ambisonics system needs $(N+1)^2$ microphones, and the distribution of these microphones can be consistent with the distribution of spherical harmonic functions of the same order. FIG. 3B shows the spherical harmonic functions of order N=0 (first row) to order N=3 (last row). FIG. 3C shows a HOA microphone.

Acquisition of Channel-Based Audio Representation

Figure 3D:
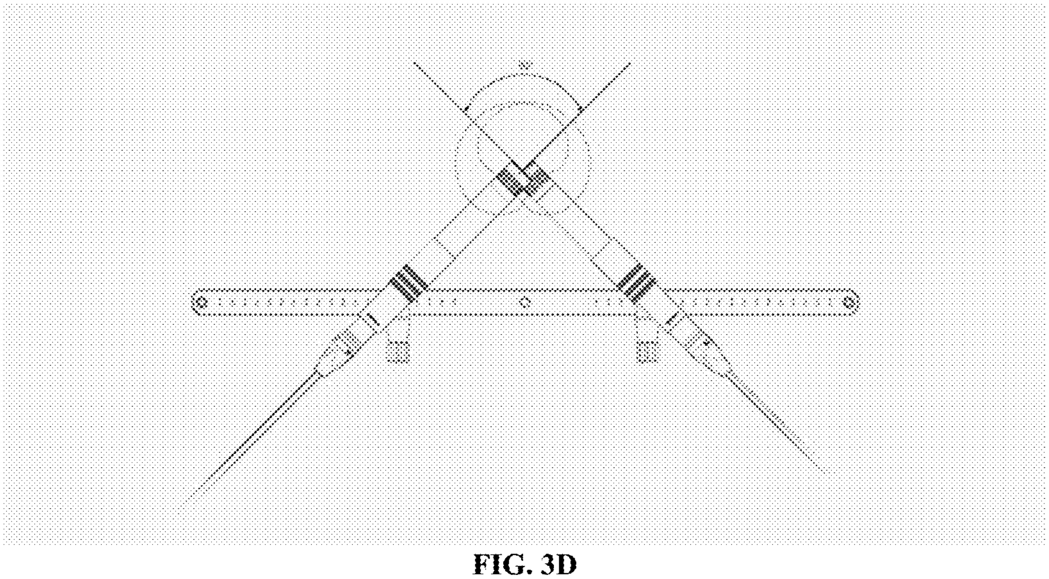
FIG. 3D shows a schematic diagram of an X-Y pair stereo microphone.

The acquisition of channel-based audio representation generally includes audio acquisition using microphones and may also include performing channel-based post-processing. As an example, a channel-based audio representation may generally indicate an audio signal including a channel. Such an acquisition system can use multiple microphones to capture sounds from different directions; or using coincident or spaced microphone arrays. According to some embodiments, according to the number and spatial arrangement of microphones, different channel-based formats can be created, for example, from the X-Y microphone (XY pair stereo Microphone) shown in FIG. 3D, 8.0 channel contents can be recorded by using a microphone array. In addition, the microphone embedded in the user equipment can also realize the recording of channel-based audio formats, such as recording stereo with mobile phone.

Acquisition of Object-Based Audio Representation

According to some embodiments, object-based audio representation can use a set of a series of single audio elements to represent a whole complex audio scene, each audio element including an audio waveform and a set of related parameters or metadata. Metadata can specify motion and transformation of each audio element in a sound scene, so as to reproduce the audio scene originally designed by the artist. The experience provided by object-based audios usually exceeds the general mono audio acquisition, which makes the audio more likely to meet the artistic intention of the producer. As an example, an object-based audio representation may generally indicate an audio signal including an object.

According to some embodiments, the spatial accuracy of the object-based audio representation depends on the metadata and the rendering system. It is not directly related to the number of channels contained in audio.

The acquisition of the object-based audio representation can be performed by using any appropriate acquisition equipment, such as a speaker, and can be processed appropriately. For example, mono audio tracks can be acquired and further processed based on metadata to obtain an object-based audio representation. As an example, a sound object usually uses mono audio tracks recorded or generated with sound design. These mono audio tracks can serve as sound elements to be further processed in a tool such as Digital Audio Workstation (DAW), for example, using metadata to specify that the sound elements are on a horizontal plane around the listener, or even anywhere in a three-dimensional space. Therefore, a "track" in the DAW can correspond to an audio object.

Additionally, according to an embodiment of the present disclosure, in order to realize, or even further optimize the immersivity, the audio acquisition system can generally consider the following factors and make corresponding optimization:

- signal-to-noise ratio (SNR). Noise sources that do not belong to the audio scene often weaken the sense of reality and immersivity, therefore, the audio acquisition system should have a noise lower limit which is low enough, so that it can be properly covered by the recorded content and would not be detected during the reproduction process.
- Acoustic overload point (AOP). The nonlinear behavior of the audio acquisition system may weaken the sense of reality, so the microphone in the audio acquisition system should have a sufficiently high acoustic overload point to avoid the nonlinear distortion caused by the audio scene of interest exceeding the threshold.
- Microphone frequency response. Microphones should have a flat frequency response in all frequency bands.
- Wind noise protection. Wind noise may lead to nonlinear audio behavior, thus weakening the sense of reality. Therefore, the audio acquisition system or microphone should be designed to weaken wind noise, for example, making it below a certain threshold.
- Configuration of microphone elements, such as spacing, crosstalk, gain and directivity matching: such aspects will eventually enhance or weaken the spatial accuracy of scene-based audio reproduction. Therefore, the above configuration aspects of the microphone can be optimized under the condition of ensuring spatial accuracy.
- Delay. If bidirectional communication is needed, the mouth to ear latency shall be low enough to allow a natural conversation experience. Therefore, the audio acquisition system should be designed to achieve low delay, for example, below a specific delay threshold.

It should be pointed out that the above-mentioned audio acquisition processing and various audio representations are only exemplary and not restrictive. The audio representation can also be in other suitable forms that are known or will be known in the future, and can be acquired by appropriate means, as long as such audio representation can be acquired from the music scene and can be used for presentation to the user.

Audio Content Production

After the audio signal is acquired by the audio capture/acquisition system, the audio signal will be input to the production stage for audio content production.

In some embodiments, in the audio content production process, it is necessary to satisfy the producer's creative function for audio contents. For example, for an object-based sound representation system, the creator needs to have the ability to edit sound objects and generate metadata, and the aforementioned metadata generation operations can be performed here. The producer's creation of audio contents can be realized in various appropriate ways.

In one example, as shown in FIG. 2B, in the production stage, input audio data and audio metadata are received, and the audio data and audio metadata are processed, especially authorization and metadata marking, to obtain production results. In some embodiments, for example, the input of audio processing may include, but not limited to, target-based audio signals, FOA (First-Order Ambisonics), HOA (Higher-Order Ambisonics), stereo, surround sound, etc., and particularly, the input of audio processing may also include scene information and metadata, etc., which is associated with the input metadata. In some embodiments, audio data is input to the audio track interface for processing, and audio metadata is processed via common audio source data (such as ADM extension, etc.). Optionally, standardization can also be carried out, especially for the results obtained by authorization and metadata marking.

In some embodiments, in the audio content production process, the creator also needs to be able to monitor and modify the work in time. As an example, an audio rendering system can be provided to provide the monitoring function of the scene. In addition, in order for consumers to obtain the artistic intention that the creator wants to express, the rendering system provided for the creator to perform monitoring should be the same as the rendering system provided by consumers to ensure a consistent experience.

Audio Production Format

Audio contents with an appropriate audio production format can be obtained during or after the audio content production process. According to an embodiment of the present disclosure, the audio production format can be various appropriate formats. As an example, the audio production format may be specified in ITU-R BS.2266-2. ITU-R BS.2266-2 specifies channel-based, object-based and scene-based audio representations, as shown in Table 1 below. For example, all the signal types in Table 1 can describe the three-dimensional audio whose goal is to bring immersive experience.

TABLE 1

| Audio Production Format | |
|---|---|
| Signal Type | Example |
| Channel-based audio<br>mix or microphone array record for a specific speaker layout, e.g., stereo 5.1, 7.1 + 4 | For example, full mix, music |
| Object-based audio<br>Audio element with position metadata<br>Rendered to the target speaker layout or headphones. | For example, dialogue, helicopter sound |
| Scene-based audio<br>B-Format (First order Ambisonics)<br>Higher order Ambisonics (HOA) | For example, crowd, ambient sound in motion |

According to some embodiments, the signal types shown in the table can be combined with audio metadata to control rendering. As an example, the audio metadata includes at least one of the following:

Channel configuration.

Normalization and channel order used by the scene-based audio representation.

Configuration and properties of the object, such as its position in space.

Narration, in particular, using head tracking technology to make the narration adapt to the movement of the listener's head, or stay still in the scene, for example, for comment tracks from an invisible speaker, static audio processing can be used without head tracking, while for visible comment tracks, the tracks can be located at the speaker in the scene according to the head tracking result.

It should be pointed out that the above-mentioned audio production process and various audio production formats are only exemplary and not restrictive. Audio production can also be performed by any other appropriate means, any other appropriate apparatus, and can adopt any other appropriate audio production format, as long as the acquired audio signal can be processed for rendering.

Intermediate Processing Stage Before Audio Rendering

According to some embodiments of the present disclosure, after the captured audio signal is produced, and before it is provided to the audio rendering stage, the audio signal may be subject to further intermediate processing.

In some embodiments, intermediate processing of audio signals may include storage and distribution of audio signals. For example, audio signals can be stored and distributed in an appropriate format, for example, can be stored in an audio storage format and distributed in an audio distribution format, respectively. The audio storage format and audio distribution format can be of various appropriate forms. The following describes existing spatial audio formats or spatial audio exchange formats related to audio storage and/or audio distribution as an example.

An example can be a container format, such as an .mp4 container, which can accommodate spatial (scene-based) and non-blind audio. This container format may include a Spatial Audio Box (SA3D), which contains information such as the type, order, channel order and standardization of Ambisonics. The container format may also include a Non-Diegetic Audio Box (SAND), which is used to represent the audio (such as comments, stereo music, etc.) that should remain unchanged when the listener's head rotates. In the implementation, Ambisonics Channel Number (ACN) channel sorting and Schmidt semi-normalization (SN3D) normalization calculation can be employed.

Another example may be based on the Audio Definition Model (ADM), which is an open standard that seeks to be compatible with audio systems based on objects, channels and scenes through XML. Its purpose is to provide a method to describe audio metadata, so that each individual audio track in a file or stream can be correctly rendered, processed or distributed. The model can be divided into content part and format part. The content part describes the contents contained in the audio, such as the language of the audio tracks (Chinese, English, Japanese, etc.) and loudness. The format part contains the technical information needed for audio to be correctly decoded or rendered, such as the position coordinates of sound objects and the order of HOA components. For example, Recommendation ITU-R BS.2076-0 specifies a series of ADM elements, such as audioTrackFormat (which describes what data format is), audioTrackUID (which uniquely identifies audio tracks or assets with audio scene records), audioPackFormat (which groups audio channels) and so on. AMD can be used for audio based on channels, objects and scenes.

Yet another example is AmbiX. AmbiX supports audio contents based on HOA scenes. AmbiX file contains linear PCM data with word length of 16-, 24- or 32-bit fixed-point number, or 32-bit floating-point number, which can support all effective sampling rates in. caf (Apple's core audio format). AmbiX adopts ACN sorting and SN3D normalization, and supports HOA and mixed-order Ambisonics. As a popular format for exchanging Ambisonics contents, AmbiX is developing rapidly.

As another example, the intermediate processing of the audio signal may also include appropriate compression processing. As an example, the produced audio content can be encoded/decoded to obtain a compression result, and then the compression result can be provided to the rendering side for rendering. For example, such compression processing can help to reduce data transmission overhead and improve data transmission efficiency. Coding and decoding in compression can be realized by any suitable technology.

It should be pointed out that the above-mentioned audio intermediate processing procedures, formats for storage, distribution, etc. are only exemplary and not restrictive. Audio intermediate processing can also include any other appropriate processing, and can also adopt any other appropriate format, as long as the processed audio signal can be effectively transmitted to the audio rendering end for rendering.

It should be pointed out that the audio transmission process also includes the transmission of metadata, the metadata can be of various appropriate forms and can be applied to all audio renderers/rendering systems, or can be correspondingly applied to each audio renderer/rendering system respectively. Such metadata may be called rendering-related metadata, and may include, for example, basic metadata and extended metadata, the basic metadata can be ADM basic metadata conforming to BS. 2076, for example. ADM metadata describing the audio format can be given in the form of XML (Extensible Markup Language). In some embodiments, metadata can be appropriately controlled, such as under hierarchical control.

The metadata is mainly realized by XML encoding. The metadata in XML format can be included in the "axml" or "bxml" block in the audio file in BW64 format for transmission, and in the generated metadata, "audio packet format identifier", "audio channel format identifier", and "audio track unique identifier" can be provided to BW64 file for linking the metadata with the actual audio track. The basic elements of metadata may include, but not limited to, at least one of the following: audio program, audio content, audio object, audio package format, audio channel format, audio stream format, audio track format, audio track unique identifier, audio block format, etc. The extended metadata can be packaged in various appropriate forms, for example, it can be packaged in a similar way with the aforementioned basic metadata, and it can contain appropriate information, identifiers, and the like.

Audio Rendering

After receiving the audio signal transmitted from the audio production stage, the audio rendering end/playback end can process the audio signal for playback/presentation to the user, in particular, the audio signal is rendered and presented to the user with a desired effect.

In some embodiments, the processing at the audio rendering end may include processing the signal from the audio production stage before rendering, as an example, as shown in FIG. 2B, according to the processing result at the production side, recovering and rendering metadata by using the audio track interface and general audio metadata (such as ADM extension); performing audio rendering on the results after metadata recovery and rendering, and inputting the obtained results into an audio apparatus for consumption by consumers. As another example, if the audio signal representation is compressed in the intermediate stage, a corresponding decompression processing can be performed at the audio rendering end.

According to an embodiment of the present disclosure, the processing at the audio rendering end may include various appropriate types of audio rendering. In particular, for each type of audio representation, corresponding audio rendering processing can be adopted. As an example, input data at the audio rendering end can be composed of a renderer identifier, metadata and audio signals, and the audio rendering end can select a corresponding renderer according to the transmitted renderer identifier, and then the selected renderer can read the corresponding metadata information and audio files, thereby performing audio playback. The input data at the audio rendering end can take various appropriate forms, for example, it can take various appropriate packaging formats, such as hierarchical format, metadata and audio files can be packaged in the inner layer, and the renderer identifier can be packaged in the outer layer. For example, the metadata and audio files may be in BW64 file format, and the outermost layer may package a renderer identifier, such as a renderer label, a renderer ID, and the like.

In some embodiments, the audio rendering process may employ scene-based audio rendering. Especially, for Scene-Based Audio (SBA), rendering can be generated adaptively mainly for application scenes, independently from capture or creation of sound scenes.

In one example, in a scene of speaker presentation, the rendering of a sound scene can be usually performed on a receiving apparatus, and a real or virtual speaker signal is generated. The speaker signal can be a vector speaker array signal $S=[S_1 \ldots S_n]^T$, where 1, . . . , n represents the $1^{st}$, . . . , nth speakers. As an example, the speaker signal S can be generated through $S=D\cdot B$, where B is a vector of SBA signal $B=B[_{(0,0)} \ldots B_{(n,m)}]^T$, the subscripts n and m in the vector represent the order and degree of spherical harmonic function respectively, and D is the rendering matrix (also called decoding matrix) of the target speaker system.

In an example, in a binaural presentation scene, an audio scene can be presented by playing back binaural signals through headphones. Binaural signals can be obtained by convolution of virtual loudspeaker signal S and binaural impulse response matrix IRBIN at the loudspeaker position $SBIN=(D\cdot B)*IRBIN$.

In one example, in an immersive application, it is desirable that the sound field rotates according to the motion of the head. The audio signal suitable for this rotation can be realized by multiplying a rotation matrix F by SBA signal $B'=F\cdot B$.

In some embodiments, the audio rendering process may employ channel-based audio rendering. In particular, for channel-based audio representation, each channel is associated with a corresponding speaker and can be presented through the corresponding speaker. The position of the speaker is standardized in ITU-R BS.2051 or MPEG CICP, for example.

In some embodiments, in a scenario of immersive audio, each speaker channel can be rendered to headphones as a virtual sound source in the scene; in other words, the audio signal of each channel can be rendered to a correct position in a virtual listening room according to the standard. The most direct method is to filter the audio signal of each virtual sound source and the response function measured in a reference listening room. The acoustic response function can be measured by a microphone placed in the head and ear of a person or an artificial person. They are called binaural room impulse responses (BRIR). This method can provide high audio quality and accurate positioning, but it has the disadvantage of high computational complexity, especially for BRIRs with a larger number of channels and longer lengths that to be rendered. Therefore, some alternative methods have been developed to reduce complexity while maintaining audio quality. Usually, these alternative methods involve a parametric model for BRIR, for example, by using sparse filters or recursive filters.

In some embodiments, the audio rendering process may employ object-based audio rendering. In particular, for object-based audio representation, audio rendering can be performed with the object and associated metadata in mind. Especially, in object-based audio rendering, each object sound source is independently presented along with its metadata, the metadata describes the spatial properties of each sound source, such as position, direction, width and so on. Using these properties, the sound source is rendered separately in the three-dimensional audio space around the listener.

Rendering can be performed with respect to speaker arrays or headphones. In one example, speaker array rendering can use different types of speaker panning methods, such as vector-based amplification panning (VBAP), and the sound played by the speaker array can present the listener with a feeling that the object sound source is located at a specified position. In another example, there are also many different ways to render for headphones, such as using HRTF (Head-Related Transfer Function) in a corresponding direction of each sound source to directly filter the sound source signal. Alternatively, an indirect rendering method can be used to render the sound source to a virtual speaker array, and then perform binaural rendering for each virtual speaker.

At present, a variety of file formats and metadata supporting immersive audio transmission and playback are being used, especially, in a conventional immersive audio system, there are different audio representation methods, such as scene-based audio representation, channel-based audio representation, and object-based audio representation, and therefore it is necessary to process various types/formats of input accordingly. Moreover, with respect to usage scenarios of consumers, playback apparatuses of immersive audio are also different, typical examples include standard speaker arrays, custom speaker arrays, special speaker arrays, headphones (binaural playback) and so on, so it is necessary to generate various types/formats of output. However, there is no a common or public document exchange standard at present. This will bring trouble to creators, because for different platforms, it is often necessary to render works repeatedly according to the definition of each platform, especially to generate audio based on objects, channels and scenes, and metadata for guiding the correct rendering of all audio elements, which leads to low efficiency and poor compatibility of existing audio systems. Therefore, it is desirable to provide a standard immersive audio rendering system that can be compatible with all the above input and output formats while ensuring the rendering effect and efficiency.

In view of this, the present disclosure proposes an audio rendering with good compatibility and high efficiency, which can be compatible with various input audio and various desired audio outputs, while ensuring the rendering effect and efficiency. In particular, in the present disclosure, an audio signal in a public space format that can be used for user application scenarios can be obtained based on the received input audio signals, that is, even if the received input audio signals may contain or be audio representation signals in different formats, such audio representation signals can be transformed/encoded into the audio signal in the public space format; then, the audio signal in the public space format can be decoded according to the type of a playback apparatus in the user's listening environment, so as to obtain output audio especially suitable for the playback apparatus in the user's listening environment, which can be well compatible with various input and output formats, and can obtain the output format especially suitable for the playback apparatus in the user's listening environment for various inputs, so as to realize an audio rendering system with good compatibility and then an audio system with good compatibility. Thus, the present disclosure realizes improved audio rendering, especially improved immersive audio rendering.

Hereinafter, an audio rendering system and method according to an embodiment of the present disclosure will be described in detail with reference to the accompanying drawings.

Figure 4A:
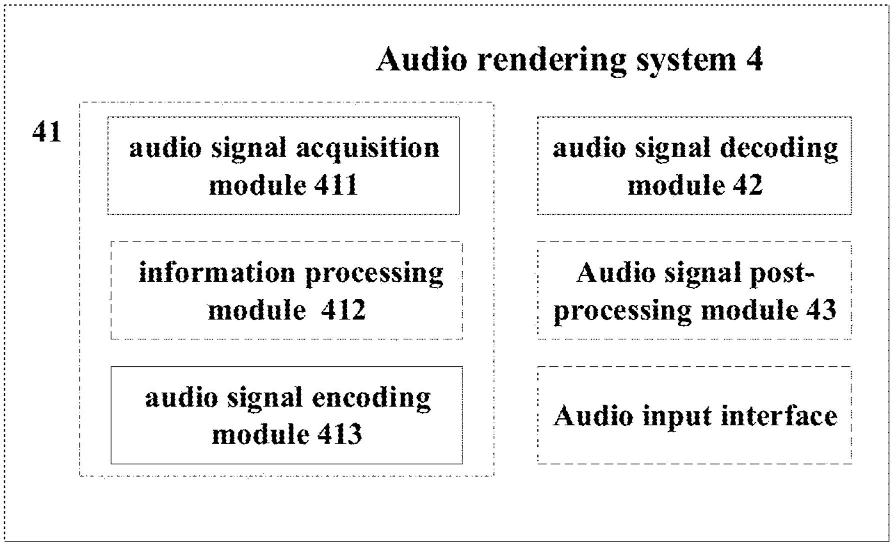
FIG. 4A shows a block diagram of an audio rendering system according to an embodiment of the present disclosure.

FIG. 4A shows a block diagram of some embodiments of an audio rendering system according to an embodiment of the present disclosure. The audio rendering system 4 includes an acquisition module 41 configured to acquire an audio signal in a specific spatial format based on an input audio signal, the audio signal in the specific spatial format may be an audio signal in a common spatial format derived from various possible audio representation signals for usage in the user's application scenarios; and an audio signal decoding module 42 configured to spatially decode the encoded audio signal in the specific spatial format to obtain a decoded audio signal for audio rendering, so that audio can be presented/played back to a user based on the spatially decoded audio signal.

According to some embodiments of the present disclosure, the audio signal in a specific spatial format can be called an intermediate audio signal during audio rendering, or an intermediate signal medium, which can have a common specific spatial format derivable from various input audio signals, for example, it can be any suitable spatial format as long as it can be supported by user application scenarios/user playback environments and is suitable for playback in the user playback environments. In particular, the intermediate signal can a kind of signal which is relatively independent from the sound source, and can be applied to different scenarios/apparatuses for playback according to different decoding methods, thereby improving the universality of the audio rendering system of the present application. As an example, the audio signal in the specific spatial format can be an audio signal of Ambisonics type, and more specifically, the audio signal in the specific spatial format can be any one or more of FOA (First Order Ambisonics), HOA (Higher Order Ambisonics) and MOA (Mixed-Order Ambisonics).

According to an embodiment of the present disclosure, the audio signal in the specific spatial format can be appropriately acquired based on the format of the input audio signal. In some embodiments, the input audio signal may be in a distributed spatial audio exchange format, which can be obtained from various audio content formats that have been acquired, thereby performing spatial audio processing on such input audio signal to obtain an audio signal with the specific spatial format. In particular, in some embodiments, the spatial audio processing may include appropriate processing on the input audio, especially including parsing, format conversion, information processing, encoding, etc., to obtain the audio signal in the specific spatial format. In other embodiments, the audio signal in the specific spatial format can be directly obtained from the input audio signal without at least some spatial audio processing. In some embodiments, the input audio signal may be in other appropriate formats other than the non-spatial audio exchange format, in particular, the input audio signal may contain or be directly a signal in a specific audio content format, such as a specific audio representation signal, or may contain or be directly an audio signal in a specific spatial format, so that the input audio signal may not need to be subject to at least some spatial audio processing, and thus it may not be necessary to perform the above-mentioned spatial audio processing, such as not perform parsing, format conversion, information processing, encoding, etc., or only part of the spatial audio processing can be performed, for example, only encoding is performed, while parsing, format conversion, etc. are not performed, so that an audio signal in the specific spatial format can be obtained.

According to an embodiment of the present disclosure, the acquisition module 41 may include an audio signal encoding module 413 configured to spatially encode the audio signal in the specific audio content format to obtain an encoded audio signal based on information related to metadata associated with the audio signal in the specific audio content format. The encoded audio signal may be included in an audio signal in the specific spatial format. According to an embodiment of the present disclosure, an audio signal in a specific audio content format may, for example, include a spatial audio signal with a specific spatial audio representation, in particular, the spatial audio signal can be at least one of a scene-based audio representation signal, a channel-based audio representation signal, and an object-based audio representation signal. In some embodiments, the audio signal encoding module 413 particularly encodes a specific type of audio signal in the audio signal in the specific audio content format, the specific type of audio signal is an audio signal that needs or is required to be spatially encoded in an audio rendering system, and may include at least one of specific channel (for example, a non-narrative channel/track) signals in a scene-based audio representation signal, an object-based audio representation signal, and a channel-based audio representation signal.

Optionally, the acquisition module 41 may include an audio signal acquisition module 411 configured to acquire an audio signal in the specific audio content format and metadata information associated with the audio signal. In some embodiments, the audio signal acquisition module may obtain the audio signal in the specific audio content format and metadata information associated with the audio signal by parsing the input signal, or receive the audio signal in the specific audio content format and metadata information associated with the audio signal which are directly input.

Optionally, the acquisition module 41 may further include an audio information processing module 412 configured to extract audio parameters of an audio signal in the specific audio content format based on metadata associated with the audio signal in the specific audio content format, so that the audio signal encoding module may be further configured to spatially encode the audio signal in the specific audio content format based on at least one of the metadata associated with the audio signal and the audio parameters. As an example, the audio information processing module can be called a scene information processor, which can provide the audio parameters extracted based on the metadata to the audio signal encoding module for encoding. The audio information processing module is not necessary for audio rendering of the present disclosure, for example, its information processing function may not be executed, or it may be outside the audio rendering system, or it may be included in other modules, such as the audio signal acquisition module or the audio signal encoding module, or its function may be realized by other modules, so it is indicated by a dotted line in the drawings.

In some embodiments, additionally or alternatively, the audio rendering system may include a signal adjustment module 43 configured to perform signal processing on the decoded audio signal. The signal processing carried out by the signal adjustment module can be called a signal post-processing, especially the post-processing of the decoded audio signal before it is played back by a playback apparatus. Therefore, the signal adjustment module can also be called a signal post-processing module. In particular, the signal adjustment module 43 can be configured to adjust the decoded audio signal based on the characteristics of the playback apparatus in the user application scenario, so as to enable the adjusted audio signal to present a more appropriate acoustic experience when rendered by an audio rendering apparatus. It should be pointed out that the audio signal adjustment module is not necessary for the audio rendering of the present disclosure, for example, the signal adjustment function may not be performed, or it may be outside the audio rendering system, or the audio signal adjustment module may be included in other modules, such as the audio signal decoding module or its function can be realized by the decoding module, so it is indicated by a dotted line in the drawings.

Additionally, the audio rendering system 4 may also include or be connected to an audio input port, which is used to receive the input audio signal, the input audio signal may be distributed and transmitted to the audio rendering system in the audio system, as mentioned above, or may be directly input by the user at the user end or the consumer end, which will be described later. Additionally, the audio rendering system 4 can also include or be connected to output apparatuses, such as audio presentation apparatuses and audio playback apparatuses, which can present the spatially decoded audio signals to users. According to some embodiments of the present disclosure, an audio presentation apparatus or an audio playback apparatus according to embodiments of the present disclosure may be any suitable audio apparatus, such as a speaker, a speaker array, a headphone, and any other suitable apparatus capable of presenting an audio signal to a user.

Figure 4B:
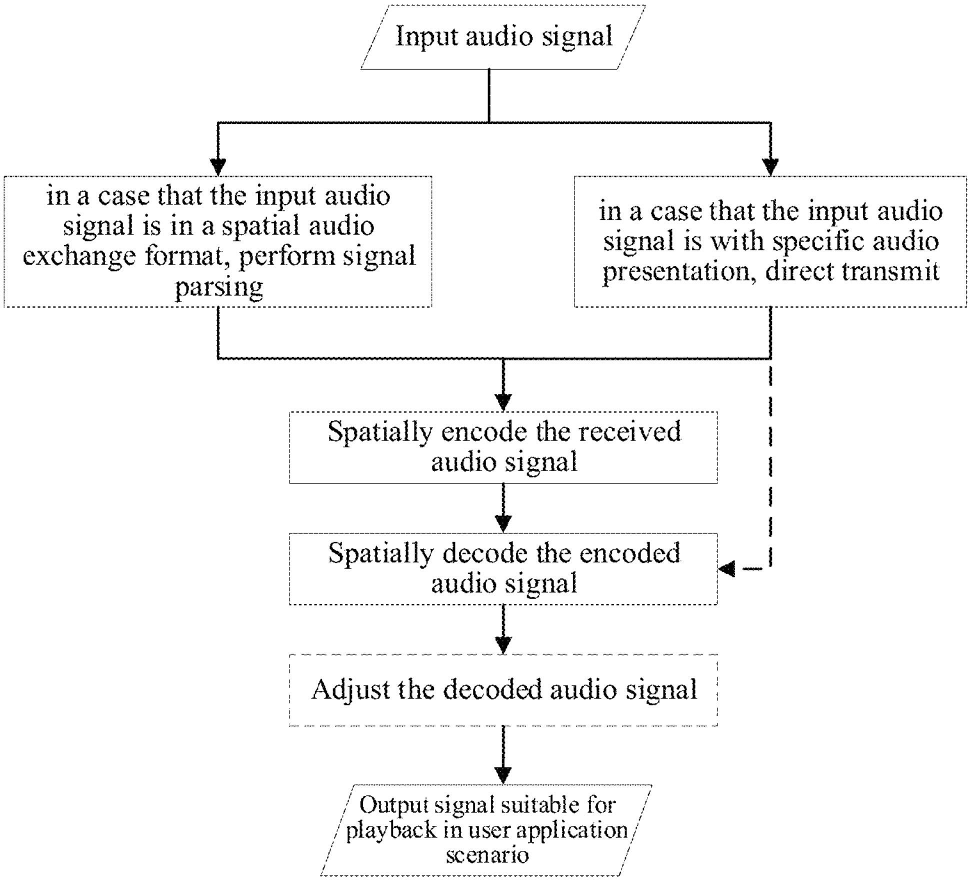
FIG. 4B shows a schematic conceptual diagram of an audio rendering process according to an embodiment of the present disclosure.

FIG. 4B shows a schematic conceptual diagram of an audio rendering process according to an embodiment of the present disclosure, showing a flow of acquiring an output audio signal suitable for rendering in a user application scenario, especially for presentation/playback to a user through an apparatus in a playback environment, based on an input audio signal.

Firstly, an audio signal in a specific spatial format that can be used for playback in the user application scenario can be obtained. In particular, depending on the format of the input audio signal, appropriate processing is performed to obtain the audio signal in the specific spatial format.

On the one hand, in the case that the input audio signal contains an audio signal in a spatial audio exchange format distributed to the audio rendering system, the input audio signal can be subjected to spatial audio processing to obtain the audio signal in the specific spatial format. In particular, the spatial audio exchange format can be any known suitable format for audio signals during signal transmission, such as the audio distribution format in audio signal distribution mentioned above, which will not be described in detail here. In some embodiments, spatial audio processing may include at least one of parsing, format conversion, information processing, encoding, etc. that is performed on the input audio signal. In particular, audio signals in various audio content formats can be obtained from input audio signals through audio parsing, and then the parsed signals can be encoded to obtain audio signals in spatial formats suitable for rendering in user application scenarios, that is, playback environments, for playback. In addition, format conversion and signal information processing can optionally be performed before encoding. Therefore, an audio signal with a specific spatial audio representation can be obtained from the input audio signal, and the audio signal in the specific spatial format can be obtained based on the audio signal with the specific spatial audio representation.

As an example, an audio signal with a specific audio representation can be obtained from an input audio signal, such as at least one of a scene-based audio representation signal, an object-based audio representation signal, and a channel-based audio representation signal. For example, if the input audio signal is an audio signal in a spatial audio exchange format, the input audio signal can be parsed to obtain a spatial audio signal with a specific spatial audio representation and metadata information corresponding to the signal, for example, the spatial audio signal may be at least one of a scene-based audio representation signal, a channel-based audio representation signal, an object-based audio representation signal, and optionally, the spatial audio signal can be further converted into a predetermined format, which may be, for example a format pre-specified/pre-defined in an audio rendering system or an audio rendering system. Of course, this format conversion is not necessary.

Further, for the obtained audio signal with the specific audio representation, audio processing can be performed based on the audio representation manner of the audio signal. Specifically, spatial audio coding may be performed on at least one of the scene-based audio representation signal, the object-based audio representation signal, and the narrative channel in the channel-based audio representation signal to obtain the audio signal with the specific spatial format. That is, even though the format/representation manner of the input audio signal may be different, the input audio signal can be converted into a common audio signal with a specific spatial format for decoding and rendering. The spatial audio coding process can be performed based on information related to metadata associated with audio signals, where the metadata related information can include metadata of audio signals directly obtained, for example, derived from input audio signals during parsing, and/or alternatively, it can also include corresponding audio parameters of spatial audio signals obtained by information processing on the metadata information of the obtained signals, and the spatial audio coding process can be performed based on the audio parameters.

On the other hand, the input audio signal can be in any other appropriate format than the non-spatial audio exchange format, especially for example, a specific spatial representation signal or even a specific spatial format signal, then in this case, an audio signal in a specific spatial format can be obtained while at least some of the aforementioned spatial audio processing can be skipped. In some embodiments, in the case that the input audio signal is not the distributed audio signal in spatial audio exchange format, but is the directly input audio signal with specific spatial audio representation, the format conversion and coding can be directly performed without needing to perform the aforementioned audio parsing process. Even when the input audio signal has a predetermined format, the encoding process is directly performed without needing to perform the format conversion. In other embodiments, if the input audio signal can directly be the audio signal in the specific spatial format, such input audio signal can be transmitted directly/transparently to the audio signal spatial decoder, without needing to be subject to spatial audio processing, such as parsing, format conversion, information processing, encoding, etc. For example, if the input audio signal is a scene-based spatial audio representation signal, such an input audio signal can be directly transmitted to the spatial decoder as a signal in a specific spatial format without being subject to the aforementioned spatial audio processing. According to some embodiments, in a case that the input audio signal is not the distributed audio signal in a spatial audio exchange format, for example, it can be an audio signal with the aforementioned specific spatial audio presentation or an audio signal in a specific spatial format, it can be directly input at the user end/consumer end, for example, it can be directly acquired from an application program interface (API) that is directly disposed in the rendering system.

For example, in the case of a signal with a specific representation directly input by the user/consumer, for example, in the case of one of the above three audio representations, it is possible to directly convert it into a format specified by the system, without performing the aforementioned parsing processing. For another example, if the input audio signal has a format specified by the system and a representation that the system can handle, it can be directly transmitted to the spatial coding processing module without performing the aforementioned parsing and transcoding. For another example, if the input audio signal is a non-narrative channel signal, a binaural signal after reverberation processing, etc., the input audio signal can be directly transmitted to the spatial decoding module for decoding, without performing the aforementioned spatial audio encoding processing. In this case, there may be a judgment unit/module in the system to judge whether the input audio signal meets the above conditions.

Then, spatial decoding can be performed on the obtained audio signal in a specific spatial format, in particular, the obtained audio signal in a specific spatial format can be called an audio signal to be decoded, and the spatial decoding of the audio signal aims to convert the audio signal to be decoded into a format suitable for playback by a playback apparatus or a rendering apparatus in a user application scenario, such as an audio playback environment, an audio rendering environment. According to an embodiment of the present disclosure, decoding can be performed according to an audio signal playback mode, which can be indicated in various appropriate ways, for example, indicated by an identifier, and can be informed to a decoding module in various appropriate ways, for example, along with an input audio signal, or can be input and informed to the decoding module by other input apparatuses. As an example, the renderer ID as described above can be used as an identifier to tell whether the playback mode is binaural playback or speaker playback, and so on. In some embodiments, audio signal decoding can utilize a decoding manner corresponding to the playback apparatus in the user application scenario, especially a decoding matrix, to decode the audio signal in this specific spatial format and transform the audio signal to be decoded into audio in an appropriate format. In other embodiments, audio signal decoding can also be performed in other appropriate ways, such as virtual signal decoding.

Optionally, after the audio signal is decoded, the decoded output can be post-processed, especially signal adjustment, which is used to adjust the spatially decoded audio signal for a specific playback apparatus in the user application scenario, especially to adjust the audio signal characteristics, so that the adjusted audio signal can present a more appropriate acoustic experience when rendered by an audio rendering apparatus.

Therefore, the decoded audio signal or the adjusted audio signal can be presented to the user in a user application scenario, for example, in an audio playback environment through an audio rendering apparatus/audio playback apparatus, so as to meet the requirements of the user.

It should be noted that the processing of audio data and/or metadata in the above rendering processing can be performed in various appropriate formats. According to some embodiments, audio signal processing can be performed in blocks, and the block size can be set. For example, the block size can be preset and kept changedly during processing. For example, the block size can be set when the audio rendering system is initialized. In some embodiments, the metadata can be parsed in blocks and then the information in the scenario can be adjusted for the metadata, such operation can be included in the operation of the scene information processing module according to the embodiment of the present disclosure, for example.

Various processes/module operations in the audio rendering process/system according to embodiments of the present disclosure will be described in further detail below with reference to the accompanying drawings.

Input Signal Acquisition

Signals suitable for rendering processing by an audio rendering system can be obtained by various appropriate means. According to an embodiment of the present disclosure, the signal suitable for rendering processing by an audio rendering system may be an audio signal in a specific audio content format. In some embodiments, an audio signal in a specific audio content format can be directly input into an audio rendering system, that is, an audio signal in a specific audio content format can be directly input as an input signal, so that it can be directly acquired. In other embodiments, an audio signal in a specific audio content format can be acquired from an audio signal input to an audio rendering system. As an example, the input audio signal may be an audio signal in other formats, such as a specific combination signal containing an audio signal in the specific audio content format, or a signal in other formats. In this case, the audio signal in the specific audio content format can be acquired by parsing the input audio signal. In this case, the input signal acquisition module can be called an audio signal parsing module, and the signal processing it performs can be called a signal fore-processing, especially processing before the audio signal is encoded.

Audio Signal Parsing

Figure 4C:
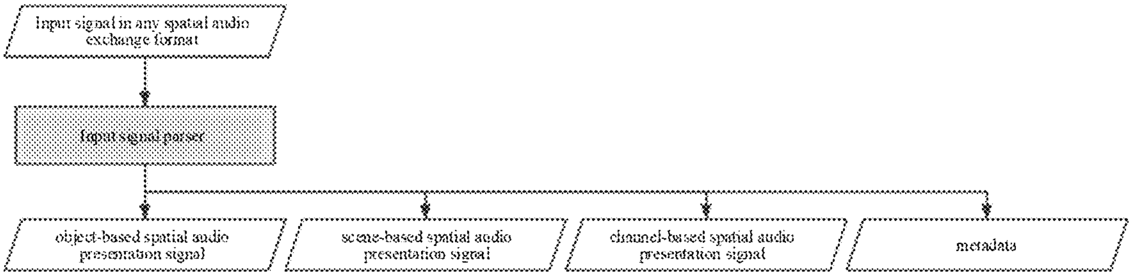
FIGS. 4C and 4D show schematic diagrams of pre-processing operations in an audio rendering system according to an embodiment of the present disclosure.
Figure 4D:
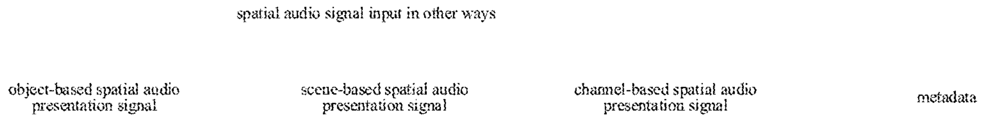

FIGS. 4C and 4D illustrate exemplary processing of an audio signal parsing module according to an embodiment of the present disclosure.

According to some embodiments of the present disclosure, considering different application scenarios, audio signals may be input in different input formats, and therefore, audio signal parsing can be performed before audio rendering processing to be compatible with inputs in different formats. Such an audio signal parsing process can be considered as a fore-processing/preprocessing. In some embodiments, the audio signal parsing module can be configured to acquire an audio signal in an audio content format compatible with the audio rendering system and its associated metadata information from an input audio signal, and in particular, can parse an input signal in an arbitrary spatial audio exchange format to acquire the audio signal in the audio content format compatible with the audio rendering system, which can include at least one of an object-based audio representation signal, a scene-based audio representation signal and a channel-based audio representation signal, and the associated metadata information. FIG. 4C shows the parsing process for signal input in any spatial audio exchange format.

Further, in some embodiments, the audio signal parsing module can further convert the acquire audio signal in the audio content format compatible with the audio rendering system to make the audio signal have a predetermined format, especially the predetermined format in the audio rendering system, for example, convert the signal into a format specified by the audio rendering system according to the signal format type. In particular, the predetermined format may correspond to the predetermined configuration parameters of the audio signal in the specific audio content format, so that the audio signal in the specific audio content format may be further converted into the predetermined configuration parameters in the audio signal parsing operation. In some embodiments, in the case that the audio signal in the audio content format compatible with the audio rendering system is a scene-based audio representation signal, the signal parsing module is configured to convert the scene-based audio signals with different channel ordering and normalization coefficients into channel ordering and normalization coefficients specified by the audio rendering system.

As an example, any signal in spatial audio exchange format used for distribution, regardless of non-streaming signal or streaming signal, can be divided into three types of signals through the input signal parser according to the signal representation manner of spatial audio, namely at least one of scene-based audio representation signal, channel-based audio representation signal and object-based audio representation signal, and the corresponding metadata of such signals. On the other hand, the signal can be converted into a system-constrained format according to the format type in the fore-processing. For example, for the scene-based spatial audio representation signal HOA, different channel ordering, such as ACN (Ambisonics Channel Number), FuMa (Furse-Malham) and SID (Single Index Design) and different normalization coefficients (N3D, SN3D, FuMa) may be used in different data exchange formats. In this step, they can be converted into a certain agreed channel ordering and normalization coefficient, such as ACN+SN3D.

In some embodiments, in the case that the input audio signal is not the distributed signal in spatial audio exchange format, it may not be necessary to perform at least some of the spatial audio processing on the input audio signal. As an example, the input specific audio signal can be directly at least one of the above three signal representations, so that the above signal parsing process can be omitted, and the audio signal and its associated metadata can be directly transmitted to the audio signal encoding module. FIG. 4D illustrates processing for a specific audio signal input according to other embodiments of the present disclosure. In other embodiments, the input audio signal may even be an audio signal with the specific spatial format as mentioned above, and such an input audio signal can be transmitted directly/transparently to the audio signal decoding module, without performing the spatial audio processing including parsing, format conversion, audio coding, etc.

In some embodiments, for such an input audio signal, the audio rendering system may further include a specific audio input apparatus for directly receiving the input audio signal and transmitting it directly/transparently to an audio signal encoding module or an audio signal decoding module. It should be pointed out that such a specific input apparatus can be, for example, an application program interface (API), and the format of the input audio signal that it can receive has been set in advance, for example, corresponding to the specific spatial format mentioned above, for example, it can be at least one of the three signal representations mentioned above, and so on, so that when the input apparatus receives the input audio signal, the input audio signal can be transmitted directly/transparently without at least some spatial audio processing. It should be pointed out that such a specific input apparatus can also be part of the audio signal acquisition operation/module, or even included in the audio signal parsing module.

It should be pointed out that the implementations of the aforementioned audio signal parsing module and specific audio input apparatus are only exemplary and not restrictive. According to some embodiments of the present disclosure, the audio signal parsing module can be implemented in various appropriate ways. In some embodiments, the audio signal parsing module may include a parsing sub-module and a direct transmission sub-module. The parsing sub-module may only receive audio signals in a spatial exchange format for audio parsing, and the direct transmission sub-module may receive an audio signal in a specific audio content format or a specific audio representation signal for direct transmission. In this way, the audio rendering system can be set so that the audio signal parsing module receives two inputs, namely, an audio signal in a spatial exchange format and an audio signal in a specific audio content format or a specific audio representation signal. In other embodiments, the audio signal parsing module may include a judgment sub-module, a parsing sub-module and a direct transmission sub-module, so that the audio signal parsing module can receive any type of input signal and process it appropriately. The judgment sub-module can judge what format/type the input audio signal is, and if it is judged that the input audio signal is an audio signal in spatial audio exchange format, it will be transferred to the parsing sub-module to perform the above-mentioned parsing operation, otherwise, the direct transmission sub-module can directly/transparently transmit the audio signal to the stages of format conversion, audio coding, audio decoding, etc., as described above. Of course, the judgment sub-module can also be outside the audio signal parsing module. Audio signal judgment can be realized in various known and appropriate ways, which will not be described in detail here.

Audio Information Processing

In some embodiments, the audio rendering system may include an audio information processing module configured to acquire audio parameters of an audio signal in a specific audio content format based on metadata associated with the audio signal in the specific audio content format, in particular, acquire audio parameters based on metadata associated with the specific type of audio signal as metadata information that can be used for encoding. According to an embodiment of the present disclosure, the audio information processing module may be called a scene information processing module/processor, and the audio parameters acquired by the audio information processing module may be input to an audio signal encoding module, whereby the audio signal encoding module may be further configured to spatially encode the specific type of audio signal based on the audio parameters. Here, a specific type of audio signal may include the aforementioned audio signal in an audio content format compatible with the audio rendering system, such as at least one of the aforementioned scene-based audio representation signal, object-based audio representation signal, and channel-based audio representation signal, and especially at least one of specific types of channel signals in object-based audio representation signal, scene-based audio representation signal, and channel-based audio representation signal. As an example, the specific type of channel signal may be called a first specific type of channel signal, which may include non-narrative sound channels/tracks in the channel-based audio representation signal. In another example, the specific type of channel signal may also include narrative channels/tracks that need not be spatially encoded according to the application scenario.

In some embodiments, the audio information processing module is further configured to acquire the audio parameters of the specific type of audio signal based on the audio content format of the specific type of audio signal, in particular, acquire the audio parameters based on the audio content format of the audio signal in an audio content format compatible with the audio rendering system derived from the input audio signal, for example, the audio parameters may be specific types of parameters corresponding to the audio content format respectively, as mentioned above.

According to some embodiments of the present disclosure, the audio signal is an object-based audio representation signal, and the audio information processing module is configured to acquire spatial attribute information of the object-based audio representation signal as an audio parameter that can be used for spatial audio encoding processing. In some embodiments, the spatial attribute information of the audio signal includes azimuth information of each audio element in the coordinate system, or relative azimuth information of the sound source related to the audio signal relative to the listener. In some embodiments, the spatial attribute information of the audio signal further includes the distance information of each sound element of the audio signal in the coordinate system. As an example, in the metadata processing of object-based audio representation, azimuth information of each sound element in the coordinate system, such as azimuth and elevation, and optionally distance information, or relative azimuth information of each sound source relative to the listener's head can be obtained.

According to some embodiments of the present disclosure, the audio signal is a scene-based audio representation signal, and the audio information processing module is configured to acquire rotation information related to the audio signal based on metadata information associated with the audio signal, for spatial audio encoding processing. In some embodiments, the rotation information related to the audio signal includes at least one of the rotation information of the audio signal and the rotation information of the listener of the audio signal. As an example, in metadata processing of scene-based audio representation, rotation information of scene audio and rotation information of listeners are read from metadata.

According to some embodiments of the present disclosure, the audio signal is a channel-based audio signal, and the audio information processing module is configured to acquire audio parameters based on the channel track type of the audio signal. In particular, the audio encoding process will mainly focus on specific types of channel-based audio signals that need to be spatially encoded, especially narrative channel tracks in channel-based audio signals, and the audio information processing module can be configured to split the audio representations of channels into audio elements by channel to convert them into metadata as audio parameters. It should be pointed out that the narrative channel tracks in channel-based audio signal may not be subject to spatial audio coding, for example, the spatial audio coding may not be performed depending on the specific application scenario, and such track may be transmitted directly to the decoding stage or further processed depending on the playback mode.

As an example, in the metadata processing of channel-based audio representation, for narrative channel tracks, the audio representation of channels can be divided into audio elements according to the standard definition of channels by channels, and converted into metadata for processing. According to the requirements of application scenarios, spatial audio processing can also be omitted, and audio mixing can be performed for different playback modes in subsequent stages. For non-narrative audio tracks, because there is no need for dynamic spatialization, they can be mixed with respect to different playback methods in the subsequent stages. That is to say, the non-narrative audio tracks will not be processed by the audio information processing module, that is, they will not be performed spatial audio processing, but can be transmitted directly/transparently by bypassing the audio information processing module.

Audio Signal Encoding

Figure 4E:
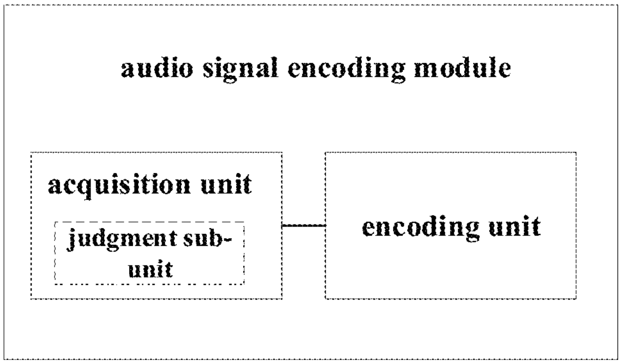
FIG. 4E shows a block diagram of an audio signal encoding module according to an embodiment of the present disclosure.
Figure 4F:
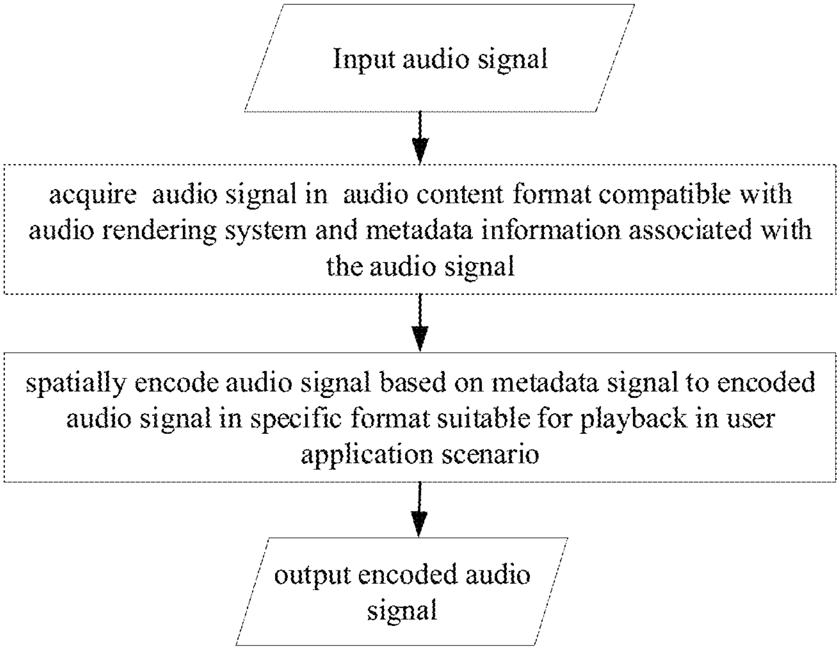
FIG. 4F shows a flowchart of audio signal spatial encoding according to an embodiment of the present disclosure.

An audio signal encoding module according to an embodiment of the present disclosure will be described below with reference to FIGS. 4E and 4F. FIG. 4E shows a block diagram of some embodiments of an audio signal encoding module, wherein the audio signal encoding module may be configured to spatially encode an audio signal in a specific audio content format based on information related to metadata associated with the audio signal in the specific audio content format to obtain an encoded audio signal. Additionally, the audio signal encoding module can also be configured to acquire an audio signal in a specific audio content format and information related to associated metadata. In one example, the audio signal encoding module may receive the audio signal and metadata related information, such as those generated by the aforementioned audio signal parsing module and audio signal processing module, via, for example, an input port/input apparatus. In another example, the audio signal encoding module can realize the operations of the aforementioned audio signal acquisition module and/or audio signal processing module, and for example, it can include the aforementioned audio signal acquisition module and/or audio signal processing module to acquire the audio signal and metadata. Here, the audio signal coding module can also be called the audio signal spatial coding module/encoder. FIG. 4F shows a flowchart of some embodiments of an audio signal encoding operation, in which an audio signal in a specific audio content format and information related to metadata associated with the audio signal are acquired; and the audio signal in the specific audio content format, is spatially encoded based on information related to metadata associated with the audio signal in the specific audio content format to obtain an encoded audio signal.

According to an embodiment of the present disclosure, the acquired audio signal in the specific audio content format may be called an audio signal to be encoded. As an example, the acquired audio signal may be a non-direct transmission/non-transparent transmission audio signal, and may have various audio content formats or audio representations, such as at least one of the three representations of audio signals mentioned above, or other suitable audio signals. As an example, such an audio signal may be, for example, an object-based audio representation signal, a scene-based audio representation signal, or a signal that has been specified in advance to be encoded for a specific application scenario, such as a narrative channel track in the channel-based audio representation signal as mentioned above. In particular, the obtained audio signal can be directly input, for example, the signal that is not performed signal parsing as mentioned above, or it can be extracted/parsed from the input audio signal, for example, the signal that is obtained by the signal parsing module mentioned above and needs no audio encoding, such as a specific type of channel signal in the channel-based audio representation signal, which can be called the second specific type of channel signal here, for example, the narrative channel tracks that are not specified to be encoded or the non-narrative channel tracks that are not required to be encoded themselves as mentioned above will not be input into the audio signal encoding module, for example, they will be transmitted directly to the subsequent decoding module.

According to an embodiment of the present disclosure, the specific spatial format can be a spatial format that can be supported by the audio rendering system, for example, it can be played back to users in different user application scenarios, such as different audio playback environments. In a sense, the encoded audio signal in a specific spatial format can be used as an intermediate signal medium, that is, it indicates that an intermediate signal with a common format is encoded from an input audio signal that may contain various spatial representations, and decoding processing is performed on the intermediate signal for rendering. The encoded audio signal in the specific spatial format can be the audio signal in the specific spatial format as mentioned above, such as FOA, HOA, MOA, etc., which will not be described in detail here. Therefore, for audio signals that may have at least one of a variety of different spatial representations, they can be spatially encoded to obtain encoded audio signals in specific spatial formats that can be used for playback in user application scenarios, that is, even though audio signals may contain different content formats/audio representations, audio signals in common spatial formats can be obtained through encoding. In some embodiments, the encoded audio signal may be added to the intermediate signal, for example, encoded into the intermediate signal. In another embodiment, the encoded audio signal can also be transmitted directly/transparently to the spatial decoder, without needing to be added to the intermediate signal. In this way, the audio signal encoding module can be compatible with various types of input signals to obtain encoded audio signals in a common space format, so that audio rendering processing can be performed efficiently.

According to an embodiment of the present disclosure, the audio signal encoding module can be realized in various appropriate ways, for example, it can include an acquisition unit and an encoding unit that respectively realize the above acquisition and encoding operations. Such spatial encoder, acquisition unit and coding unit can be implemented in various appropriate forms, such as software, hardware, firmware, etc. or any combination. In some embodiments, the audio signal encoding module can be implemented to receive only the audio signal to be encoded, such as the audio signal to be encoded directly input or obtained from the audio signal parsing module. That is to say, the signal input to the audio signal encoding module must be encoded. As an example, in this case, the acquisition unit can be implemented as a signal input interface, which can directly receive the audio signal to be encoded. In other embodiments, the audio signal encoding module can be implemented to receive audio signals or audio representation signals in various audio content formats. Thus, in addition to the acquisition unit and the encoding unit, the audio signal encoding module may also include a judgment unit, which can judge whether the audio signal received by the audio signal encoding module is an audio signal that needs to be encoded, and if it is judged to be an audio signal that needs to be encoded, the audio signal is transmitted to the acquisition unit and the encoding unit; and if it is judged to be an audio signal that does not need to be encoded, the audio signal is directly transmitted to the decoding module without audio encoding. In some embodiments, the judgement can be performed in various appropriate ways, for example, the comparison can be made with reference to the audio content format or audio signal representation manner of audio, and when the format or representation manner of the input audio signal matches the format or representation manner of the audio signal that needs to be encoded, it is judged that the input audio signal needs to be encoded. For example, the judgment unit can also receive other reference information, such as application scenario information, rules specified for a specific application scenario in advance, etc., and make a judgment based on this reference information, as mentioned above, when the rules specified for a specific application scenario in advance are known, the audio signal that needs to be encoded can be selected from audio signals according to the rules. For another example, the judgment unit may also acquire an identifier related to the signal type, and judge whether the signal needs to be encoded according to the identifier related to the signal type. The identifier may be in various suitable forms, such as a signal type identifier, and any other suitable indication information that can indicate the signal type.

According to some embodiments of the present disclosure, information related to metadata associated with an audio signal may include metadata in an appropriate form and may depend on the signal type of the audio signal, and in particular, the metadata information may correspond to a signal representation of the signal. For example, for example, for object-based signal representation, metadata information may be related to the attributes of audio object, especially spatial attributes; for scene-based signal representation, metadata information can be related to the attributes of scene; for channel-based signal representation, metadata information can be related to the attributes of channel. In some embodiments of the present disclosure, it can be said that the audio signal is encoded according to the type of the audio signal, and in particular, the audio signal can be encoded based on information related to metadata corresponding to the type of the audio signal.

According to an embodiment of the present disclosure, information related to metadata associated with an audio signal may include at least one of metadata associated with the audio signal and audio parameters of the audio signal derived based on the metadata. In some embodiments, the metadata related information may include metadata related to the audio signal, such as metadata acquired together with the audio signal, such as directly input or acquired through signal parsing. In other embodiments, the metadata-related information may also include the audio parameters of the audio signal derived based on the metadata, as described above for the operation of the information processing module.

According to embodiments of the present disclosure, metadata related information can be obtained through various appropriate ways. In particular, metadata information can be obtained through signal parsing, or directly input, or obtained through specific processing. In some embodiments, the metadata related information can be the metadata associated with a specific audio representation signal obtained by parsing the distributed input signal in the spatial audio exchange format through the signal parsing process as described above. In some embodiments, the metadata-related information can be directly input when the audio signal is input, for example, in the case that the input audio signal can be directly input through the API without performing the aforementioned audio signal parsing, the metadata-related information can be input together with the audio signal when the audio signal is input, or can be input separately from the audio signal. In other embodiments, the metadata that is parsed from audio signal or the metadata that is directly input can be further processed, such as information processing, so that appropriate audio parameters/information can be obtained as metadata information for audio encoding. According to an embodiment of the present disclosure, the information processing may be called scene information processing, and in the information processing, processing may be performed based on metadata associated with an audio signal to obtain appropriate audio parameters/information. In some embodiments, for example, based on the metadata, signals in different formats can be extracted and corresponding audio parameters can be calculated, which can be related to rendering application scenarios as an example. In other embodiments, scene information may be adjusted based on metadata, for example.

According to an embodiment of the present disclosure, an audio signal to be encoded will be encoded based on information related to metadata associated with the audio signal. In particular, the audio signal to be encoded may include a specific type of audio signal in the audio signal in the specific audio content format, and the specific type of audio signal will be spatially encoded based on metadata related information associated with the specific type of audio signal to obtain an encoded audio signal in a specific spatial format. Such encoding can be called spatial encoding.

Accord to some embodiments, the audio signal encoding module may be configured to weight the audio signal according to metadata information. In particular, the audio signal encoding module may be configured to perform weighting according to weights in metadata. This metadata can be associated with the audio signal to be encoded acquired by the audio signal encoding module, for example, with signals/audio representation signals in various audio content formats, as mentioned above. In particular, in some embodiments, the audio signal encoding module may be further configured to weight the acquired audio signal, especially the audio signal in a specific audio content format, based on metadata associated with the audio signal. In other embodiments, the audio signal encoding module can also be configured to further perform additional processing on the encoded audio signal, such as weighting, rotation, etc. In particular, the audio signal encoding module may be configured to convert the audio signal in the specific audio content format into an audio signal in a specific spatial format, and then weight the obtained audio signal in the specific spatial format based on metadata, to obtain an intermediate signal. In some embodiments, the audio signal encoding module may be configured to further process the audio signal in the specific spatial format which is converted based on metadata, such as format conversion, rotation, etc. In some embodiments, the audio signal encoding module can be configured to convert the encoded or directly input audio signal in the specific spatial format to meet the constrained formats supported by the current system, for example, it can be converted in the terms of channel arrangement method, regularization method, etc. to meet the requirements of the system.

According to some embodiments of the present disclosure, the audio signal in the specific audio content format is an object-based audio representation signal, and the audio signal encoding module is configured to spatially encode the object-based audio representation signal based on the spatial attribute information of the object-based audio representation signal. In particular, encoding can be performed by matrix multiplication. In some embodiments, the spatial attribute information of the object-based audio representation signal may include information related to spatial propagation of sound objects based on the audio signal, especially information related to spatial propagation paths of sound objects to listeners. In some embodiments, the information related to the spatial propagation paths of the sound objects to the listeners may include at least one of propagation duration, propagation distance, azimuth information, path energy intensity and nodes along the way of each spatial propagation paths of the sound object to the listeners.

In some embodiments, the audio signal encoding module is configured to spatially encode an object-based audio signal according to at least one of a filter function and a spherical harmonic function, wherein the filter function can be a filter function for filtering the audio signal based on the path energy intensity of a spatial propagation path of a sound object in the audio signal to a listener, and the spherical harmonic function can be a spherical harmonic function based on the azimuth information of the spatial propagation path. In some embodiments, audio signal encoding may be performed based on a combination of both a filter function and a spherical harmonic function. As an example, audio signal encoding can be performed based on the product of both the filter function and the spherical harmonic function.

In some embodiments, the spatial audio encoding for the object-based audio signal may be further based on the delay of the sound object in spatial propagation, for example, may be based on the propagation duration of the spatial propagation path. In this case, the filter function for filtering the audio signal based on the path energy intensity is a filter function for filtering an audio signal of a sound object before propagating along the spatial propagation path based on the path energy intensity of the path. In some embodiments, the audio signal of the sound object before propagating along the spatial propagation path may refer to an audio signal at a moment before the time required for the sound object to reach the listener along the spatial propagation path, for example, the audio signal of the sound object before the propagation duration.

In some embodiments, the azimuth information of the spatial propagation path may include the direction angle of the spatial propagation path to the listener or the direction angle of the spatial propagation path relative to the coordinate system. In some embodiments, the spherical harmonic function based on the azimuth of the spatial propagation path can be any suitable form of spherical harmonic function.

In some embodiments, the spatial audio coding of the object-based audio signal can further encode the audio signal by adopting at least one of a near-field compensation function and a diffusion function based on the length of the spatial propagation path of the sound object in the audio signal to the listener. For example, depending on the length of the spatial propagation path, at least one of the near-field compensation function and the diffusion function can be applied to the audio signal of the sound object for the propagation path to make appropriate audio signal compensation and enhance the effect.

In some embodiments, spatial encoding of an object-based audio signal, such as the spatial encoding of an object-based audio signal as described above, may be performed for one or more spatial propagation paths of a sound object to a listener, respectively. Particularly, when there is one spatial propagation path of the sound object to the listener, the spatial encoding of the object-based audio signal is performed for this spatial propagation path, while when there are multiple spatial propagation paths of the sound object to the listener, the spatial encoding can be performed for at least one or even all of the multiple spatial propagation paths. Specifically, the relevant information of each spatial propagation path of the sound object to the listener can be considered separately, and the audio signal corresponding to the spatial propagation path can be encoded accordingly, and then the encoding results for respective spatial propagation paths can be combined to obtain the encoding result for the sound object. The spatial propagation path between the sound object and the listener can be determined in various appropriate ways, especially determined by the information processing module mentioned above by acquiring the spatial attribute information.

In some embodiments, spatial encoding of an object-based audio signal may be performed for each of one or more sound objects contained in the audio signal, and the encoding process for each sound object may be performed as described above. In some embodiments, the audio signal encoding module is further configured to weighted combine the encoded signals of the respective object-based audio representation signals based on the weights for the sound objects defined in the metadata. Particularly, in the case that the audio signal contains multiple sound objects, for each sound object in the audio signal, spatial encoding can be performed on the object-based audio representation signal based on the spatial propagation related information of the sound objects of the audio signal, for example, spatial encoding can be performed on the audio representation signal with respect to the spatial propagation path of each sound object as mentioned above, and then, the encoded audio signals of sound objects can be weighted combined by using the weight for each sound object contained in the metadata associated with the audio representation signal.

As an example, in the spatial coding process based on object-based audio representation, for each audio object, considering the time delay of sound propagation in space, the audio signal will be written into a delay apparatus. It can be known from the metadata information associated with the audio representation signal, especially the audio parameters obtained by the audio information processing module, that each sound object will have one or more propagation paths to the listener, and according to the length of each path, the time t1 required for the sound object to the listener can be calculated, so the audio signal s of the sound object before t1 can be obtained from the delayer of the audio object, and the audio signal can be filtered by a filtering function E based on the path energy intensity. Further, the azimuth information of the path, such as the direction angle θ of the path to the listener, can be acquired from the metadata information associated with the audio representation signal, especially the audio parameters obtained by the audio information processing module, and a specific function based on the azimuth angle, such as the spherical harmonic function Y for the corresponding channel, can be used, so that based on the both, the audio signal can be encoded into a encoded signal, such as the HOA signal s. Let N be the number of channels of the HOA signal, then the HOA signal SN obtained by audio encoding processing can be expressed as follows:

$$S_N=E(s(t-t_1))Y_N(\theta)$$

Alternatively or optionally, for the azimuth information of the path, the orientation of the path relative to the coordinate system can also be used, instead of the direction to the listener, so that the target sound field signal can be obtained with multiplication by the rotation matrix in the subsequent step, as the encoded audio signal. For example, if the azimuth information of path is the orientation of the path relative to the coordinate system, the multiplication by rotation matrix can be further performed on the basis of the above formula, to obtain the encoded HOA signal.

In some embodiments of the present disclosure, the encoding operation may be performed in the time domain or the frequency domain. Further, encoding can also be performed based on the distance of the spatial propagation path of the sound object to the listener, and in particular, at least one of near-field compensation function and source spread function can be further applied according to the distance of the path to enhance the effect. For example, the near-field compensation function and/or the source spread function can be further applied on the basis of the above-mentioned encoded HOA signal, and in particular, the near-field compensation function can be applied when the distance of the path is less than the threshold, and the source spread function can be applied when it is greater than the threshold, and vice versa, so as to further optimize the above-mentioned encoded HOA signal.

Finally, the HOA signals obtained after the signal conversion of each sound object can be weightedly superposed according to the weight for the sound object defined in the metadata, that is, a weighted sum signal of all object-based audio signals can be obtained as an encoded signal, which can serve as an intermediate signal.

In some embodiments, the spatial encoding of the object-based audio signal can also be performed based on reverberation information, and the obtained encoded signal can be directly transmitted to the spatial decoder for decoding, or can be added to the intermediate signal output by the encoder. In some embodiments, the audio signal encoding module is further configured to obtain reverberation parameter information and perform reverberation processing on the audio signal to acquire the reverberation related signal of the audio signal. In particular, the spatial reverberation response of the scene can be obtained, and convolution of audio signal can be performed based on the spatial reverberation response to obtain a reverberation related signal of the audio signal. The reverberation parameter information can be obtained in various appropriate ways, such as obtained from metadata information, obtained from the aforementioned information processing module, input by users or from other input apparatuses, and so on.

As an example, for a more advanced information processor, the spatial room reverberation response for a user application scenario may be generated, includes but not limited to RIR (Room Impulse Response), ARIR (Ambisonics Room Impulse Response), BRIR (Binaural Room Impulse Response), MO-BRIR (Multi orientation Binaural Room Impulse Response). In the case of obtaining this kind of information, a convolver can be added to the encoding module to process the audio signal. According to different reverberation types, the processing result may be intermediate signal (ARIR), omnidirectional signal (RIR) or binaural signal (BRIR, MO-BRIR), and the processing result may be added to the intermediate signal or transmitted transparently to the next step for corresponding playback decoding. Optionally, the information processor may also provide reverberation parameter information such as reverberation duration, and an artificial reverberation generator (for example, a Feedback delay network) can be added to the encoding module to perform artificial reverberation processing, and the result can be output to an intermediate signal or transmitted transparently to a decoder for processing.

In some embodiments, the audio signal in a specific audio content format is a scene-based audio representation signal, and the audio signal encoding module is further configured to weight the scene-based audio representation signal based on weight information indicated by or contained in metadata associated with the audio representation signal. In this way, the weighted signal can be used as an encoded audio signal for spatial decoding. In some embodiments, the audio signal in a specific audio content format is a scene-based audio representation signal, and the audio signal encoding module is further configured to perform a sound field rotation operation on the scene-based audio representation signal based on spatial rotation information indicated by or contained in metadata associated with the audio representation signal. In this way, the rotated audio signal can be used as an encoded audio signal for spatial decoding.

As an example, the scene audio signal itself is a FOA, HOA or MOA signal, so it can be weighted directly according to the weight information in the metadata, that is, the desired intermediate signal. In addition, if the metadata indicates that the sound field needs to rotate, the processing of sound field rotation can be performed in the encoding module according to different implementations. For example, the scene audio signal can be multiplied by parameters indicating the rotation characteristics of the sound field, such as that in forms of vectors, matrices and the like, so that the audio signal can be further processed. It should be noted that this sound field rotation operation may also be performed in the decoding stage. In some implementations, the sound field rotation operation may be performed in one of the encoding and decoding stages, or in both.

In some embodiments, the audio signal in a specific audio content format is a channel-based audio representation signal, and the audio signal encoding module is further configured to, when the channel-based audio representation signal needs to be converted, convert the channel-based audio representation signal that needs to be converted into an object-based audio representation signal and encode it. The encoding operation here can be performed as described above for encoding an object-based audio representation signal. In some embodiments, the channel-based audio representation signal that needs to be converted may include a narrative channel track in the channel-based audio representation signal, and the audio signal encoding module is further configured to convert the audio representation signal corresponding to the narrative channel track into an object-based audio representation signal and encode it, as described above. In other embodiments, for a narrative channel track in the channel-based audio representation signal, the audio representation signal corresponding to the narrative channel track can be split into audio elements by channel and converted into metadata for encoding.

In some embodiments, the audio signal in a specific audio content format is a channel-based audio representation signal, and the channel-based audio representation information may not need spatial audio processing, especially spatial audio encoding, such a channel-based audio representation signal will be transmitted directly to the audio decoding module and processed in an appropriate manner for playback/rendering. Especially, in some embodiments, in the case that the narrative channel track in the channel-based audio representation signal does not perform spatial audio processing according to the needs of the scene, for example, it is stipulated in advance that the narrative channel track does not need encoding processing, the narrative channel track can be directly transmitted to the decoding step. In other embodiments, the non-narrative channel track in the channel-based audio representation signal itself does not need spatial audio processing, so it can be directly transmitted to the decoding step.

As an example, the spatial encoding processing of channel-based audio representation signals can be performed based on a predetermined rule, the predetermined rule can be provided in an appropriate manner, and in particular can be specified in an information processing module. For example, it can be specified that a channel-based audio representation signal especially a narrative channel track in a channel-based audio representation signal, needs to be audio encoded. Therefore, audio encoding can be performed in an appropriate manner according to the specification. The audio encoding mode can be a mode that the audio presentation signal can be converted into an object-based audio representation for processing as described above, or it can be any other coding mode, such as a pre-agreed encoding mode for the channel-based audio signals. On the other hand, in the case that it has been stipulated that the channel-based audio representation signal, especially the narrative channel track therein, does not need to be converted, or in the case of the non-narrative channel track in the channel-based audio representation signal, the audio representation signal can be directly transmitted to the decoding module/stage, so that it can be processed for different playback modes.

Audio Signal Decoding

According to an embodiment of the present disclosure, after the audio signal is performed audio encoding or transmitted directly/transparently as described above, audio decoding processing will be performed on such encoded audio signal or directly transmitted/transparently transmitted audio signal in order to obtain an audio signal suitable for playback/rendering in user application scenarios. In particular, such an encoded audio signal or a directly transmitted/transparently transmitted audio signal may be called a signal to be decoded, and may correspond to an audio signal in a specific spatial format as described above, or an intermediate signal. As an example, the audio signal in the specific spatial format may be the aforementioned intermediate signal, or it may be an audio signal transmitted directly/transparently to the spatial decoder, including an uncoded audio signal, or an encoded audio signal that has been spatially encoded but not included in the intermediate signal, such as a non-narrative channel signal and a binaural signal after reverberation. The audio decoding process may be performed by an audio signal decoding module.

According to an embodiment of the present disclosure, the audio signal decoding module can decode the intermediate signal and the transparently transmitted signal to the playback/play apparatus according to the playback mode. Thus, the audio signal to be decoded can be converted into a format suitable for playback through a playback apparatus in a user application scenario, such as an audio playback environment or an audio rendering environment. According to an embodiment of the present disclosure, the playback mode may be related to the configuration of the playback apparatus in the user application scenario. In particular, depending on the configuration information of the playback apparatus in the user application scenario, such as identifier, type and arrangement of the playback apparatus, a corresponding decoding mode can be adopted. In this way, the decoded audio signal can be suitable for a specific type of playback environment, especially suitable for playback apparatuses in the playback environment, thus achieving compatibility with various types of playback environments.

As an example, the audio signal decoder can perform decoding according to information related to the type of the user application scenario, the information can be a type indicator of the user application scenario, for example, a type indicator of a rendering apparatus/playback apparatus in the user application scenario, such as a renderer ID, so that decoding processing corresponding to the renderer ID can be performed to obtain an audio signal suitable for playback by the renderer. As an example, the renderer ID can be that, as described above, each renderer ID can correspond to a specific renderer arrangement/playback scenario/playback apparatus arrangement, etc., so that an audio signal suitable for playback through the renderer arrangement/playback scenario/playback apparatus arrangement corresponding to the renderer ID can be decoded. In some embodiments, the playback mode, such as the renderer ID, can be specified in advance, transmitted to the rendering end, or input through an input port. In some embodiments, an audio signal decoder decodes an audio signal in a specific spatial format by using a decoding mode corresponding to a playback apparatus in a user application scenario.

In some embodiments, the playback apparatus in the user application scenario may include a speaker array, which may correspond to a speaker playbacking/rendering scene. In this case, the audio signal decoder may decode the audio signal in the specific spatial format by using a decoding matrix corresponding to the speaker array in the user application scenario. As an example, such a user application scenario may correspond to a specific renderer ID, such as the aforementioned renderer ID2. In particular, for example, corresponding identifiers can be set according to the types of speaker arrays, so as to indicate the user application scenarios more accurately. For example, corresponding identifiers can be set for standard speaker arrays, custom speaker arrays, and so on.

The decoding matrix can be determined depending on the configuration information of the speaker array, such as the type and arrangement of the speaker array. In some embodiments, in the case that the playback apparatus in the user application scenario is a predetermined speaker array, the decoding matrix is a decoding matrix built in the audio signal decoder or received from the outside and corresponding to the predetermined speaker array. In particular, the decoding matrix can be a preset decoding matrix, which can be stored in the decoding module in advance, for example, can be stored in a database in association with/corresponding to the types of speaker arrays, or otherwise provided to the decoding module. The decoding module can call a corresponding decoding matrix according to the known predetermined speaker array type to perform decoding processing. The decoding matrix may be in various suitable forms, for example, it may contain gains, such as gain values of HOA tracks/channels to speakers, so that the gains can be directly applied to the HOA signals to generate output audio channels, so as to render the HOA signals into the speaker array.

As an example, for a standard speaker array defined in the standard, such as 5.1, the decoder will have built-in decoding matrix coefficients, and the playback signal L can be acquired by multiplying the intermediate signal with the decoding matrix.

$$L = DS_N,$$

Where L is the speaker array signal, D is the decoding matrix, and SN is the intermediate signal, which is obtained as described above. On the other hand, the directly/transparently transmitted audio signal can be converted into a speaker array according to the definition of a standard speaker, for example, it can be multiplied by a decoding matrix as described above, and other suitable methods can be adopted, such as Vector-base amplitude panning (VBAP) or the like. As another example, in the case of spatial decoding of special speaker arrays, for Sound Bar or some more special speaker arrays, the speaker manufacturer is required to provide a decoding matrix with corresponding design. The system provides a decoding matrix setting interface to receive the decoding matrix related parameters corresponding to the special speaker array, so that the received decoding matrix can be used for decoding processing, as described above.

In other embodiments, when the playback apparatus in the user application scenario is a custom speaker array, the decoding matrix is a decoding matrix calculated according to the arrangement of the custom speaker array. As an example, the decoding matrix is calculated according to the azimuth and pitch angles of each speaker or the three-dimensional coordinate values of the speaker in the speaker array. As an example, in the spatial decoding of custom speaker array, in the scenario of custom speaker array, such speakers usually have spherical, hemispherical or rectangular design, which can surround or semi-surround the listener. The decoding module can calculate the decoding matrix according to the arrangement of the custom speakers, and the required inputs may be the azimuth and pitch angle of each speaker or the three-dimensional coordinate values of the speakers. The calculation methods of speaker decoding matrix can be SAD (Sampling Ambisonics Decoder), MMD (Mode Matching Decoder), EPAD (Energy Preserved Ambisonics Decoder), AllRAD (All Round Ambisonics Decoder) and so on.

According to some embodiments of the present disclosure, in the case that the playback apparatus in the user application scenario is an earphone, it may correspond to a scenario such as headphone rendering/playback, binaural rendering/playback, and the like, the audio signal decoder can be configured to directly decode an audio signal to be decoded into a binaural signal as a decoded audio signal, or perform speaker virtualization to obtain a decoded signal as a decoded audio signal. As an example, such a user application scenario may correspond to a specific renderer ID, such as the aforementioned renderer ID1. As an example, there may be various suitable decoding methods for the playback environment of headphones. In some embodiments, for example, the signal to be decoded, such as the aforementioned intermediate signal, can be directly decoded into a binaural signal. In particular, the signal to be decoded can be directly decoded, for example, the HOA signal can be converted by determining a rotation matrix according to the listener's posture, and then the HOA channel/track can be adjusted, such as convolution (for example, convolution by means of gain matrix, harmonic function, HRIR (head-related impulse response), spherical harmonic HRIR, etc., such as frequency domain convolution), so that binaural signals can be obtained. In other words, such a process can also be regarded as that the HOA signal is directly multiplied by a decoding matrix, which may include rotation matrix, gain matrix, harmonic function and so on. As an example, typical methods may include LS (least squares), Magnitude LS, SPR (Spatial resampling) and so on. For transparently transmitted signals, usually binaural signals, they are played back directly. As another example, indirect rendering can also be performed, that is, the speaker array will be used first, and then HRTF convolution will be performed according to the position of the loudspeaker to virtualize the loudspeaker, so as to obtain the decoded signal.

In some embodiments, in the audio decoding process, the audio signal to be decoded can also be processed based on metadata information associated with the audio signal to be decoded. In particular, the audio signal to be decoded can be spatially transformed according to spatial transformation information in the metadata information, for example, when rotation is indicated in the metadata information, the sound field rotation operation can be performed on the audio representation signal to be decoded based on rotation information indicated in the metadata. As an example, firstly, according to the processing method of the previous module and the rotation information in the metadata, the intermediate signal can be multiplied with the rotation matrix as needed to obtain the rotated intermediate signal, so that the rotated intermediate signal can be decoded. It should be noted that spatial transformation, such as spatial rotation, here and the spatial encoding, such as spatial rotation, in the spatial encoding process described above can be performed alternatively.

Audio Signal Post-Processing

According to the embodiment of the present disclosure, optionally or additionally, the spatially decoded audio signal can be adjusted for a specific playback apparatus in a user application scenario, aiming at enabling the adjusted audio signal to present a more appropriate acoustic experience when rendered by an audio rendering apparatus. In particular, the adjustment of audio signals can mainly aim at eliminating the possible inconsistency between different playback types or different playback modes, and then make the playback experience of the adjusted audio signals consistent when playing back in application scenarios, and improve the user's experience. In the context of this disclosure, audio signal adjustment processing can be called a post-processing, which refers to post-processing the output signal obtained by audio decoding, which can be called output signal post-processing. In some embodiments, the signal post-processing module is configured to perform at least one of frequency response compensation and dynamic control range on the decoded audio signal for a specific playback apparatus.

As an example, in consideration of the inconsistency of different playback modes, and different playback apparatuses having different frequency response curves and gains, the post-processing module can perform post-processing adjustment on the output signal so as to present a consistent acoustic experience. Post-processing operations include, but not limited to, frequency response compensation (EQ) and Dynamic range control (DRC) for a specific apparatus.

In the audio rendering system of the present disclosure, the audio information processing module, the audio signal encoding module, the signal space decoder and the output signal post-processing as described above can constitute the core rendering modules of the system, which are responsible for processing the signals in three audio representation formats obtained through the pre-processing and their metadata, and playing them back through the playback apparatus in the user application environment.

It should be noted that each module of the audio rendering system described above is only a logical module classified according to the specific function it realizes, and is not used to limit the specific implementation, for example, it can be implemented in software, hardware or a combination of software and hardware. In actual implementation, the above modules can be realized as independent physical entities, or can also be realized by a single entity (for example, a processor (CPU or DSP, etc.), an integrated circuit, etc.), for example, an encoder, a decoder, etc. can adopt a chip (such as an integrated circuit module including a single wafer), a hardware component or a complete product. In addition, the above-mentioned modules, when indicated by dotted lines in the drawings, may indicate that these units may not actually exist, but the operations/functions they realize may be realized by other modules or systems or even the apparatus themselves that contain the modules. For example, at least one of the audio signal parsing module 411, the information processing module 412, and the audio signal encoding module 413 shown in FIG. 4A may be located outside the acquisition module 41 and exist in the audio rendering system 4, for example, between the acquisition module 41 and the decoder 42, and sequentially process the input audio signal to obtain the audio signal to be processed by the decoder. It can even be located outside the audio rendering system.

In addition, although not shown, the audio rendering system 4 may also include a memory, which may store various information generated by various modules included in the system and apparatus during operation, programs and data used for operation, data to be sent by the communication unit, and the like. The memory may be a volatile memory and/or a nonvolatile memory. For example, the memory may include, but not limited to, random access memory (RAM), dynamic random access memory (DRAM), static random access memory (SRAM), read-only memory (ROM), and flash memory. Of course, the memory may also be located outside the apparatus.

In addition, optionally, the audio rendering system 4 may also include other components not shown, such as an interface, a communication unit, and the like. As an example, the interface and/or the communication unit may be used to receive an input audio signal to be rendered, and may also output the finally generated audio signal to a playback apparatus in a playback environment for playback. In one example, the communication unit can be implemented in an appropriate manner known in the art, including, for example, communication components such as antenna arrays and/or radio frequency links, various types of interfaces, communication units, and the like, which will not be described in detail here. In addition, the apparatus may also include other components not shown, such as radio frequency link, baseband processing unit, network interface, processor, controller, etc., which will not be described in detail here.

Figure 4G:
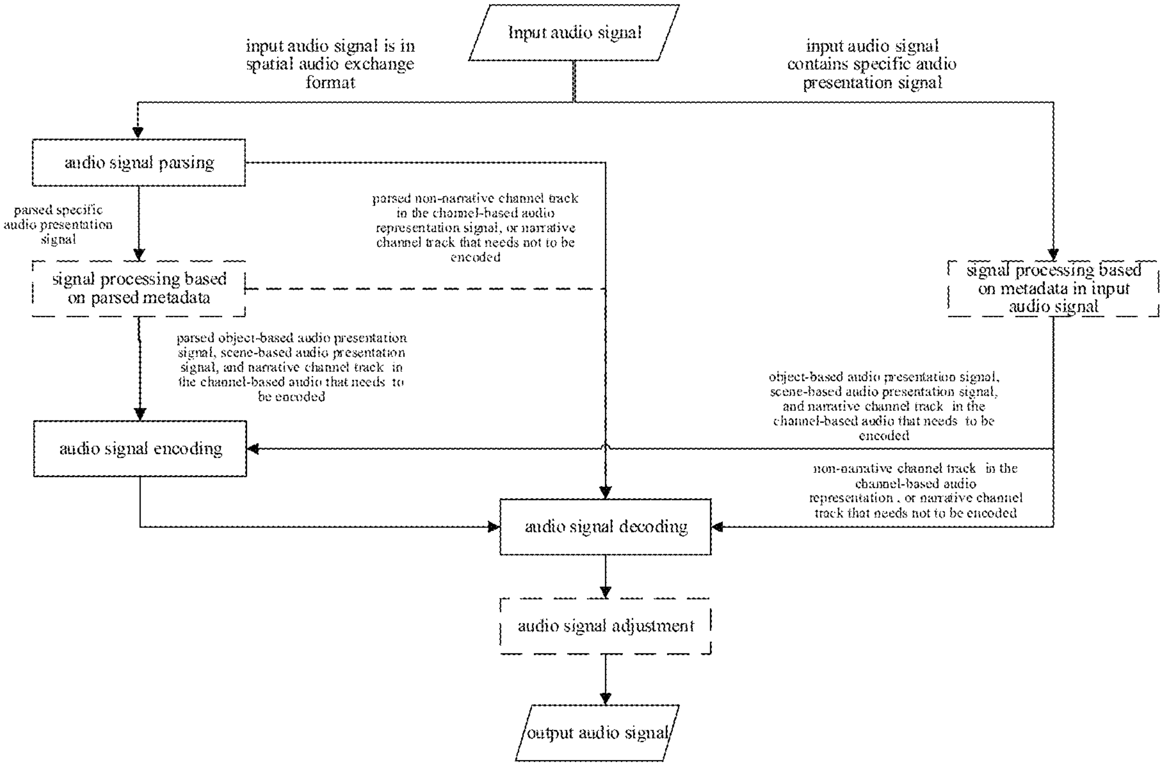
FIG. 4G shows a flowchart of an exemplary implementation of an audio rendering process according to an embodiment of the present disclosure.
Figure 4H:
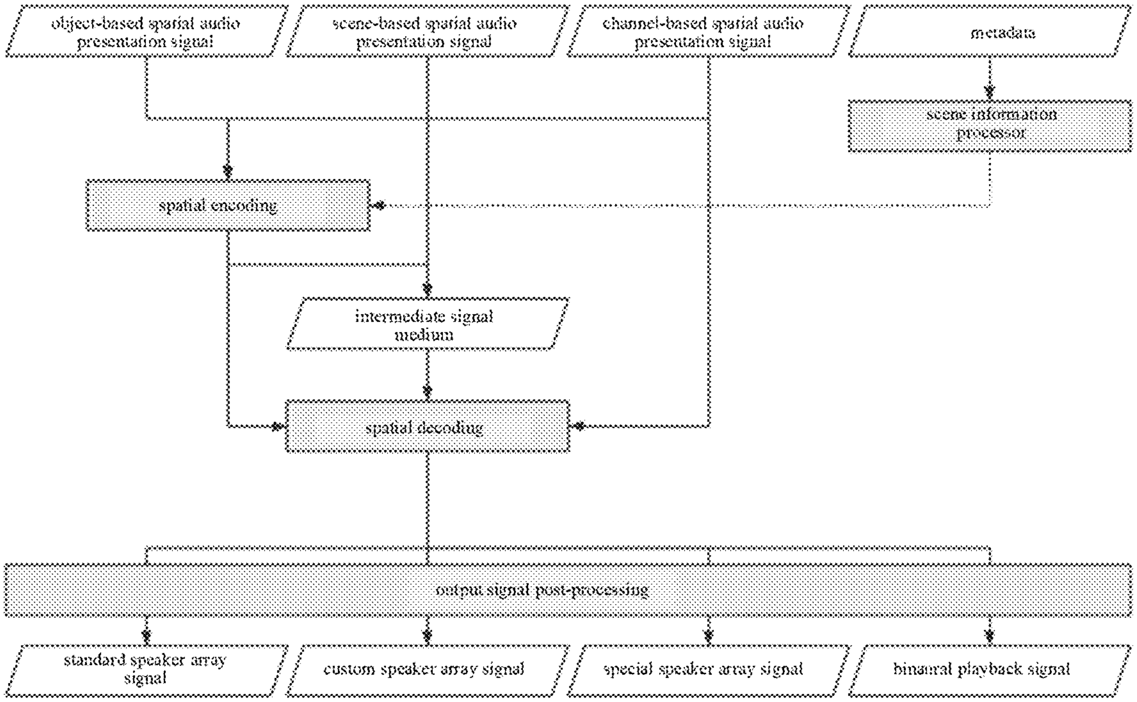
FIG. 4H shows a schematic diagram of an exemplary implementation of an audio rendering process according to an embodiment of the present disclosure.

Exemplary implementations of audio rendering according to embodiments of the present disclosure will be described below with reference to the accompanying drawings, in which FIGS. 4G and 4H show flowcharts of exemplary implementations of an audio rendering process according to embodiments of the present disclosure. As an example, the audio rendering system mainly includes a rendering metadata system and a core rendering system, in the metadata system, there are control information describing audio content and rendering techniques, such as whether the input form of audio is single channel, double channel, multi channel, or object or sound field HOA, as well as position information of dynamic sound source and listener, and rendered acoustic environment information such as room shape, size, wall material, etc. The core rendering system can perform corresponding rendering for playback apparatuses and environments according to different audio signal representations and metadata parsed from the metadata system.

First, the input audio signal is received, and then is parsed or transmitted directly according to the format of the input audio signal. On one hand, when the input audio signal is an input signal in any spatial audio exchange format, the input audio signal can be parsed to obtain an audio signal in a specific spatial audio representation, such as an object-based spatial audio representation signal, a scene-based spatial audio representation signal, a channel-based spatial audio representation signal, and associated metadata, and then the parsing result is passed to the subsequent processing stage. On the other hand, when the input audio signal is directly an audio signal in a specific spatial audio representation, it can be directly transmitted to the subsequent processing stage without parsing. For example, such an audio signal can be transmitted directly to the audio coding stage, such as an object-based audio representation signal, a scene-based audio representation signal, and a narrative channel track that needs to be encoded in the channel-based audio representation signal. Even if the audio signal in the specific spatial representation is of a type/format that needs not to be encoded, it can be transmitted directly to the audio decoding stage, for example, it can be a parsed non-narrative channel track in the channel-based audio representation or a narrative channel track that needs not to be encoded.

Then, information processing can be performed based on the obtained metadata, so as to extract and obtain audio parameters related to each audio signal, and such audio parameters can be used as metadata information. The information processing here can be performed for either the parsed audio signal or the directly transmitted audio signal. Of course, as mentioned above, such information processing is optional and not necessary.

Next, signal coding is performed on the audio signal with the specific spatial audio presentation. On one hand, signal encoding can be performed on the audio signal with the specific spatial audio representation based on metadata information, and the obtained encoded audio signal is either transmitted directly to the subsequent audio decoding stage, or an intermediate signal can be obtained and then transmitted to the subsequent audio decoding stage. On the other hand, if the audio signal with the specific spatial audio representation needs not to be encoded, such audio signal can be transmitted directly to the audio decoding stage.

Then, in the audio decoding stage, the received audio signal can be decoded to obtain an audio signal suitable for playback in the user application scenario as an output signal, and such an output signal can be presented to the user through an audio playback apparatus in the user application scenario, for example, an audio playback environment.

Figure 4I:
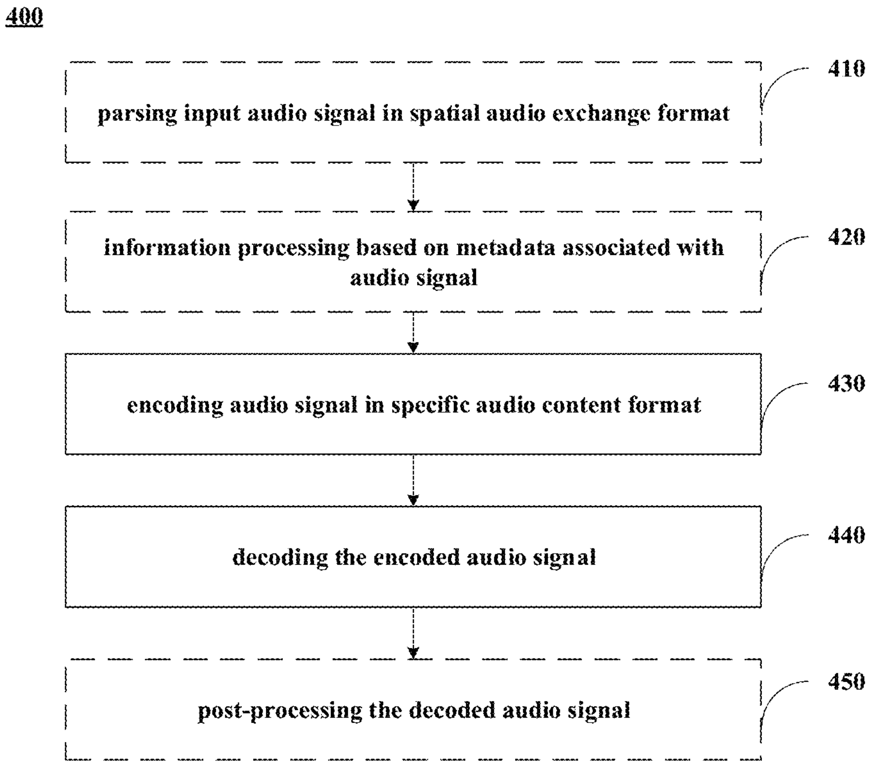
FIG. 4I shows a flowchart of an audio rendering method according to an embodiment of the present disclosure.

FIG. 4I shows a flowchart of some embodiments of an audio rendering method according to the present disclosure. As shown in FIG. 4I, in method 400, in step S430 (also called audio signal encoding step), an audio signal in a specific audio content format can be spatially encoded based on metadata information associated with the audio signal in the specific audio content format to obtain an encoded audio signal; and in step S440 (also called audio signal decoding step), the encoded audio signal in the specific spatial format can be spatially decoded to obtain a decoded audio signal for audio rendering.

In some embodiments of the present disclosure, the method 400 may further include step S410 (also called audio signal acquisition step), in which an audio signal in a specific audio content format and metadata information associated with the audio signal can be acquired. In the audio signal acquisition step, it may further include parsing the input audio signal to obtain an audio signal conforming to a specific spatial audio representation, and performing format conversion on the audio signal conforming to the specific spatial audio representation to obtain the audio signal in the specific audio content format.

In some embodiments of the present disclosure, the method 400 may further include a step S420 (also called an information processing step), in which audio parameters of the specific type of audio signal can be extracted based on metadata information associated with the specific type of audio signal. In particular, in the audio information processing step, the audio parameters of the specific type of audio signal can be further extracted based on the audio content format of the specific type of audio signal. Therefore, in the audio signal encoding step, it may further include spatially encoding the specific type of audio signal based on the audio parameters.

In some embodiments of the present disclosure, in the audio signal decoding step, the audio signal in the specific spatial format may be further decoded based on a playback mode. In particular, decoding can be performed by using a decoding method corresponding to the playback apparatus in the user application scenario.

In some embodiments of the present disclosure, the method 400 may further include a signal input step, in which an input audio signal is received, and directly transmitted to the audio signal encoding step if the input audio signal is a specific type of audio signal in an audio signal in specific audio content format, or directly transmitted to the audio signal decoding step if the input audio signal is an input audio signal in a specific audio content format and not the specific type of audio signal.

In some embodiments of the present disclosure, the method 400 may further include step S450 (also called signal post-processing step), in which the decoded audio signal may be post-processed. In particular, post-processing can be performed based on characteristics of the playback apparatus in the user application scenario.

It should be pointed out that the above-mentioned signal acquisition step, information processing step, signal input step and signal post-processing step are not necessarily included in the rendering method according to the present disclosure, that is, even if such steps are not included, the method according to the present disclosure is still complete and can effectively solve the problems to be solved by the present disclosure and achieve advantageous effects. For example, these steps may be performed outside the method according to the present disclosure and the result of these steps can be provided to the method of the present disclosure, or may receive a result signal of the method of the present disclosure. In addition, in the exemplary view, these steps can also be combined with other steps of the present disclosure, for example, a signal acquisition step can be included in a signal encoding step, for example, an information processing step and a signal input step can be included in a signal acquisition step, or an information processing step can be included in a signal encoding step, or a signal post-processing step can be included in a signal decoding step. Therefore, these steps are shown by dotted lines in the drawings.

Although not shown, the audio rendering method according to the present disclosure may further include other steps to realize the processing/operation in the pre-processing, audio information processing, audio signal spatial coding, etc., which will not be described in detail here. It should be pointed out that the audio rendering method according to the present disclosure and the steps therein can be executed by any suitable apparatus, such as a processor, an integrated circuit, a chip, etc., for example, by the aforementioned audio rendering system and various modules therein, and the method can also be embodied in computer programs, instructions, computer program media, computer program products, etc.

Figure 5:
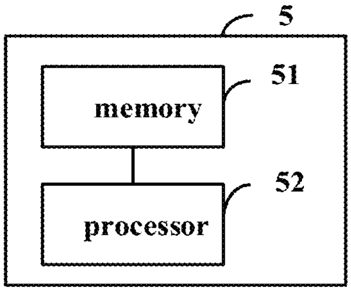
FIG. 5 shows a block diagram of some embodiments of an electronic apparatus of the present disclosure.

FIG. 5 shows a block diagram of an electronic apparatus according to some embodiments of the present disclosure. As shown in FIG. 5, the electronic apparatus 5 of this embodiment includes a memory 51 and a processor 52 coupled to the memory 51, and the processor 52 is configured to execute audio signal encoding or decoding or the rendering method of audio signals in any embodiment of the present disclosure based on instructions stored in the memory 51.

The memory 51 may include, for example, a system memory, a fixed non-volatile storage medium, and the like. The system memory stores, for example, an operating system, application programs, a Boot Loader, a database and other programs.

Figure 6:
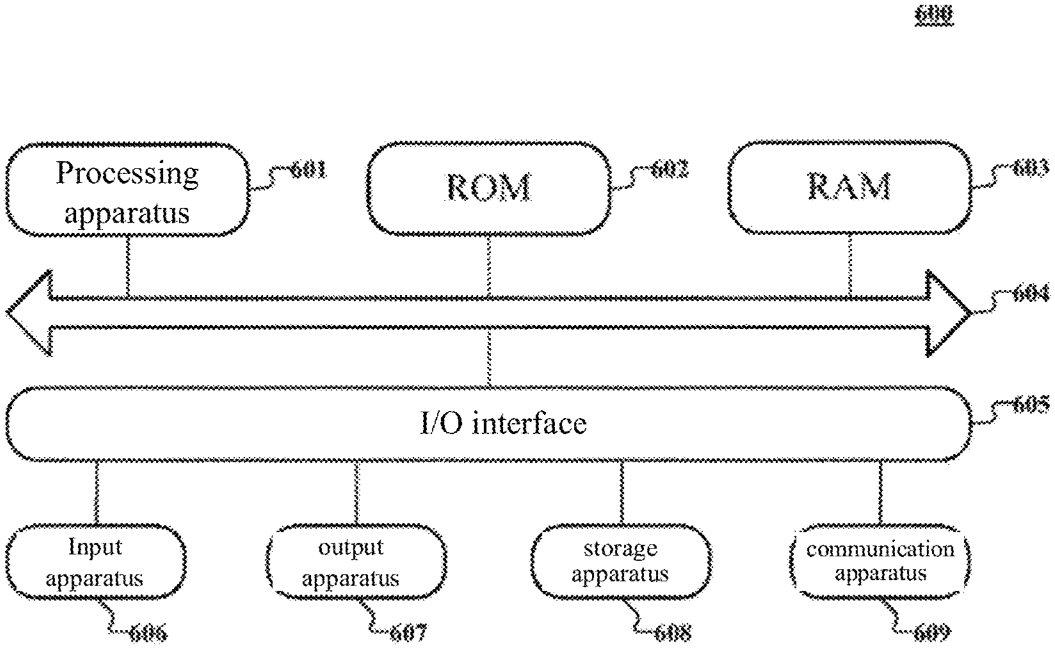
FIG. 6 shows a block diagram of other embodiments of the electronic apparatus of the present disclosure.

Reference is now made to FIG. 6, which shows a structural schematic diagram of an electronic apparatus suitable for implementing an embodiment of the present disclosure. The electronic apparatuses in the embodiment of the present disclosure may include, but not limited to, mobile terminals such as mobile phones, notebook computers, digital broadcast receivers, PDA (Personal Digital Assistant), PAD (Tablet Computer), PMP (Portable Multimedia Player), vehicle-mounted terminals (such as vehicle-mounted navigation terminals), and fixed terminals such as digital TV and desktop computers. The electronic apparatus shown in FIG. 6 is just an example, and should not bring any limitation to the function and application scope of the embodiment of the present disclosure.

FIG. 6 shows a block diagram of other embodiments of the electronic apparatus of the present disclosure.

As shown in FIG. 6, the electronic apparatus may include a processing apparatus (such as a central processing unit, a graphics processor, etc.) 601, which may perform various appropriate operations and processes according to a program stored in a read-only memory (ROM) 602 or a program loaded into a random access memory (RAM) 603 from a storage apparatus 608. In the RAM 603, various programs and data required for operation of the electronic apparatus are also stored. A processing apparatus 601, a ROM 602 and a RAM 603 are connected to each other through a bus 604. An input/output (I/O) interface 605 is also connected to the bus 604.

Generally, the following apparatuses can be connected to the I/O interface 605: an input apparatus 606 including, for example, a touch screen, a touch pad, a keyboard, a mouse, an image sensor, a microphone, an accelerometer, a gyroscope, etc.; an output apparatus 607 including, for example, a liquid crystal display (LCD), a speaker, a vibrator, etc.; a storage apparatus 608 such as a magnetic tape, a hard disk, etc.; and a communication apparatus 609. The communication apparatus 609 may allow the electronic apparatus to communicate wirelessly or wired with other apparatuses to exchange data. Although FIG. 6 shows an electronic apparatus with various apparatuses, it should be understood that it is not required to implement or have all the apparatuses shown. More or fewer apparatuses may alternatively be implemented or provided.

According to an embodiment of the present disclosure, the process described above with reference to the flowchart may be implemented as a computer software program. For example, an embodiment of the present disclosure includes a computer program product, which includes a computer program carried on a computer-readable medium, and the computer program contains program code for executing the method shown in the flowchart. In such an embodiment, the computer program can be downloaded and installed from the network through the communication apparatus 609, or installed from the storage apparatus 608, or installed from the ROM 602. When the computer program is executed by the processing apparatus 601, the above functions defined in the method of the embodiment of the present disclosure are performed.

In some embodiments, there is provided a chip, which comprises at least one processor and an interface, wherein the interface is used for providing computer-executable instructions for the at least one processor, and the at least one processor is used for executing the computer-executable instructions, so as to realize audio signal encoding or decoding or the audio signal rendering method of any one of the above embodiments.

Figure 7:
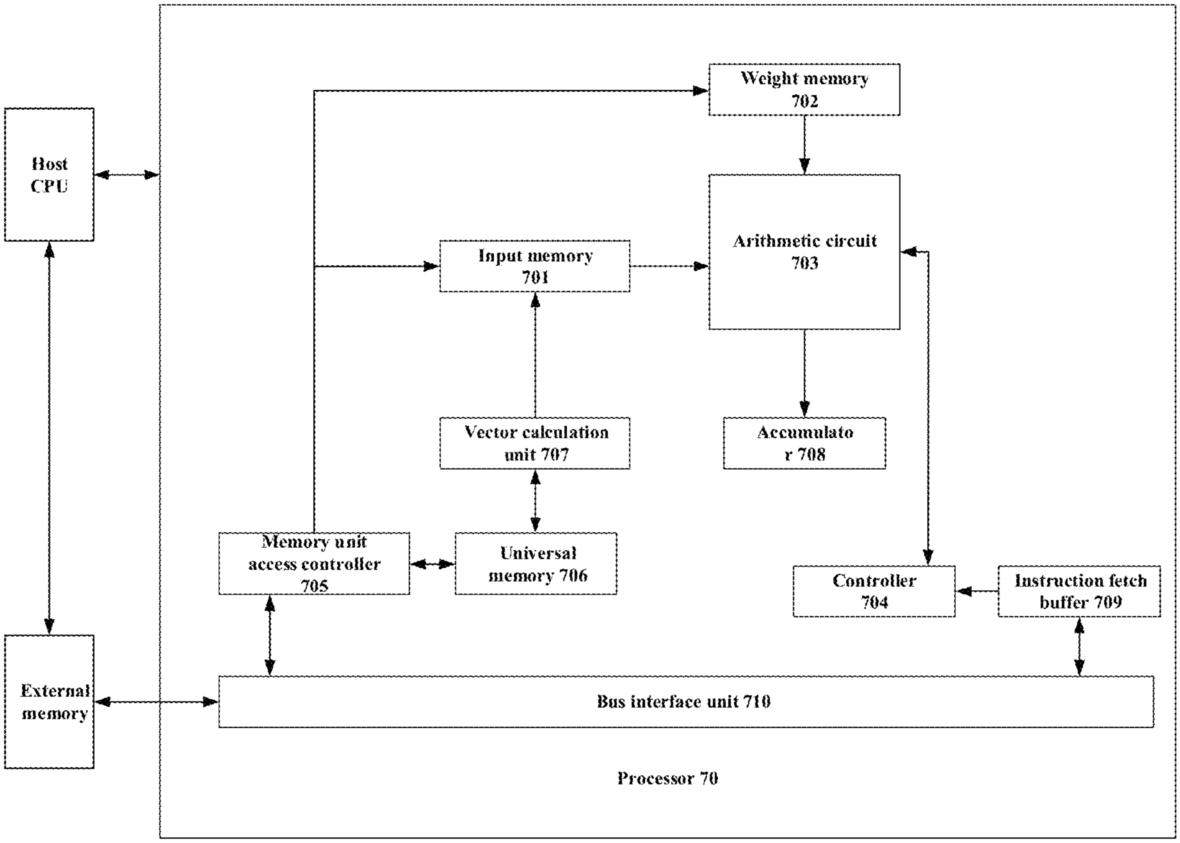
FIG. 7 shows a block diagram of some embodiments of a chip of the present disclosure.

FIG. 7 shows a block diagram of a chip capable of implementing some embodiments according to the present disclosure. As shown in FIG. 7, the processor 70 of the chip can be mounted on a Host CPU as a co-processor, and tasks are assigned by the Host CPU. The core part of the processor 70 is an arithmetic circuit, and the controller 704 controls the arithmetic circuit 703 to extract the data in the memory (a weight memory or an input memory) and perform the operation.

In some embodiments, the arithmetic circuit 703 internally includes a plurality of process engines (PE). In some embodiments, the arithmetic circuit 703 is a two-dimensional systolic array. The arithmetic circuit 703 can also be a one-dimensional systolic array or any other electronic circuit capable of performing mathematical operations such as multiplication and addition. In some embodiments, the arithmetic circuit 703 is a general matrix processor.

For example, suppose there is an input matrix A, a weight matrix B and an output matrix C. The arithmetic circuit takes the data corresponding to the matrix B from the weight memory 702 and buffers it on each PE in the arithmetic circuit. The operation circuit takes the data of matrix A from the input memory 701 and performs matrix operation along with matrix B, and a partial or final result of the matrix obtained can be stored in the accumulator 708.

The vector calculation unit 707 can further process the output of the operation circuit, such as vector multiplication, vector addition, exponential operation, logarithmic operation, magnitude comparison, and so on.

In some embodiments, the vector calculation unit 707 can store the processed output vector to a unified buffer 706. For example, the vector calculation unit 707 may apply a non-linear function to the output of the operation circuit 703, such as a vector of accumulated values, to generate an activation value. In some embodiments, the vector calculation unit 707 generates normalized values, combined values, or both. In some embodiments, the processed output vector can be used as an activation input to the arithmetic circuit 703, for example, for usage in a subsequent layer in a neural network.

The unified memory 706 may be used to store input data and output data.

A memory unit access controller 705 (Direct Memory Access Controller, DMAC) transports the input data in the external memory to the input memory 701 and/or the unified memory 706, stores the weight data in the external memory into the weight memory 702, and stores the data in the unified memory 706 into the external memory.

Bus Interface Unit (BIU) 510 is used to realize interaction among the main CPU, DMAC and fetch memory 709 through the bus.

An instruction fetch buffer 709 connected to the controller 704 is used for storing instructions used by the controller 704;

The controller 704 is used to call the instructions cached in the instruction fetch buffer 709 to control the working process of the operation accelerator.

Generally, the unified memory 706, the input memory 701, the weight memory 702 and the instruction fetch memory 709 are all On-Chip memories, and the external memory is the memory outside the NPU, the external memory can be Double Data Rate Synchronous Dynamic Random Access Memory (DDR SDRAM), High Bandwidth Memory (HBM), or other readable and writable memories.

In some embodiments, there may also provide a computer program, which comprises instructions which, when executed by a processor, cause the processor to perform the audio signal processing of any one of the above embodiments, especially any processing in the audio signal rendering process.

It should be understood by those skilled in the art that the present disclosure can take the form of an entirely hardware embodiment, an entirely software embodiment, or an embodiment combining software and hardware aspects. When implemented in software, the above-mentioned embodiments can be implemented in the form of computer program products as a whole or in part. A computer program product includes one or more computer instructions or computer programs. When computer instructions or computer programs are loaded or executed on a computer, the processes or functions according to the embodiments of the present application can be generated as a whole or in part. The computer can be a general-purpose computer, a special-purpose computer, a computer network, or other programmable apparatuses. Furthermore, the present disclosure may take the form of a computer program product embodied on one or more computer-usable non-transitory storage media (including but not limited to disk storage, CD-ROM, optical storage, etc.) in which computer-usable program codes are contained.

Although some specific embodiments of the present disclosure have been described in detail through examples, it should be understood by those skilled in the art that the above examples are only for illustrative and are not intended to limit the scope of the present disclosure. It should be understood by those skilled in the art that the above embodiments can be modified without departing from the scope and spirit of the present disclosure. The scope of the present disclosure is defined by the appended claims.

What is claimed is:

1. An audio rendering system, comprising:

an audio information processing module configured to acquire relevant parameters of an audio signal in a specific audio content format based on metadata associated with the audio signal in the specific audio content format, wherein the audio signal in the specific audio content format comprises at least one of an object-based audio representation signal, a scene-based audio representation signal, or a channel-based audio representation signal;

an audio signal spatial encoding module configured to spatially encode the audio signal in the specific audio content format based on the relevant parameters of the audio signal in the specific audio content format to obtain a spatially encoded audio signal in a common spatial format, wherein the spatially encoded audio signal is an Ambisonics type of audio signal, wherein the audio signal spatial encoding module is further configured to in response to the audio signal in the specific audio content format comprising the object-based audio representation signal, spatially encode the object-based audio representation signal based on spatial attribute information in relevant parameters of the object-based audio representation signal, wherein the spatial attribute information of the object-based audio representation signal comprises information related to a spatial propagation path of a sound object of the audio signal to a listener, which comprises at least one of propagation duration, propagation distance, azimuth information, path energy intensity and nodes along the way of the spatial propagation path of the sound object to the listener; and an audio signal decoding module configured to spatially decode the encoded audio signal to obtain a decoded audio signal for audio rendering.

2. The audio rendering system of claim 1, wherein the spatially encoded audio signal comprises at least one of First Order Ambisonics (FOA), Higher Order Ambisonics (HOA) and Mixed-Order Ambisonics (MOA).

3. The audio rendering system of claim 1, wherein the audio signal encoding module is further configured to, in response to the audio signal in the specific audio content format comprising an object-based audio representation signal, acquire a reverberation relevant signal of the object-based audio representation signal based on reverberation parameters in the relevant parameters of the object-based audio representation signal, or, wherein the audio signal encoding module is further configured to, in response to the audio signal in the specific audio content format comprising a scene-based audio representation signal, weight the scene-based audio representation signal based on weight information in the relevant parameters of the scene-based audio representation signal, or wherein the audio signal encoding module is further configured to, in response to the audio signal in the specific audio content format comprising a scene-based audio representation signal, perform a sound field rotation operation on the scene-based audio representation signal based on the rotation information indicated in the relevant parameters of the scene-based audio representation signal, or, wherein the audio signal encoding module is further configured to, in response to the audio signal in the specific audio content format comprising a specific type of channel signal in the channel-based audio representation signal, convert the specific type of channel signal into an object-based audio representation signal and then encode it, or, wherein the audio signal encoding module is further configured to, in response to the audio signal in the specific audio content format comprising a specific type of channel signal in the channel-based audio representation signal, split the specific type of channel signal into audio elements by channel and convert them into metadata for encoding.

4. The audio rendering system of claim 1, wherein the audio signal decoding module is further configured to spatially decode an audio signal that has not spatially encoded, wherein the audio signal that has not spatially encoded comprises at least one of a scene-based audio representation signal, a specific type of channel signal in a channel-based audio representation signal, and a reverberated audio signal.

5. The audio rendering system of claim 1, wherein the audio signal decoding module is configured to, in a speaker playback mode, spatially decode the audio signal to be decoded by using a decoding matrix corresponding to speaker configuration, wherein the decoding matrix comprises at least one of the following:

in response to playbacking by a predetermined speaker array, the decoding matrix is a decoding matrix built in the audio rendering system or the audio signal decoding module or a decoding matrix received from the outside and corresponding to the predetermined speaker array, or in response to playbacking by a custom speaker array, the decoding matrix is calculated according to arrangement manner of the custom speaker array.

6. The audio rendering system of claim 5, wherein the decoding matrix is calculated according to azimuth angle and pitch angle of each speaker in the speaker array or three-dimensional coordinate values of the speaker.

7. The audio rendering system of claim 1, wherein the audio signal decoding module is configured to, in a binaural playback mode, directly decode an audio signal into a binaural signal as a decoded audio signal or perform speaker virtualization to obtain a decoded signal as a decoded audio signal, or, wherein the audio signal decoding module is configured to, a binaural playback mode, convert the audio signal to be decoded by using a rotation matrix based on the listener's posture, and perform frequency domain convolution on each signal channel to obtain a decoded audio signal, or, wherein the audio signal decoding module is configured to perform a sound field rotation operation on the audio signal based on rotation information in the relevant parameters.

8. The audio rendering system of claim 1, further comprising a signal post-processing module configured to post-process the decoded audio signal.

9. An audio rendering method, comprising:

an audio information processing step of acquiring relevant parameters of an audio signal in a specific audio content format based on metadata associated with the audio signal in the specific audio content format, wherein the audio signal in the specific audio content format comprises at least one of an object-based audio representation signal, a scene-based audio representation signal, or a channel-based audio representation signal;

an audio signal encoding step of spatially encoding the audio signal in the specific audio content format based on the relevant parameters of the audio signal in the specific audio content format to obtain a spatially encoded audio signal in a common spatial format, wherein the spatially encoded audio signal is an Ambisonics type of audio signal, wherein the audio signal encoding step further comprises, in response to the audio signal in the specific audio content format comprising the object-based audio representation signal, spatially encoding the object-based audio representation signal based on spatial attribute information in relevant parameters of the object-based audio representation signal, wherein the spatial attribute information of the object-based audio representation signal comprises information related to a spatial propagation path of a sound object of the audio signal to a listener, which comprises at least one of propagation duration, propagation distance, azimuth information, path energy intensity and nodes along the way of the spatial propagation path of the sound object to the listener; and an audio signal decoding step of spatially decoding the encoded audio signal to obtain a decoded audio signal for audio rendering.

10. The audio rendering method of claim 9, wherein the spatially encoded audio signal comprises at least one of First Order Ambisonics (FOA), Higher Order Ambisonics (HOA) and Mixed-Order Ambisonics (MOA).

11. The audio rendering method of claim 9, wherein, wherein the audio signal encoding step further comprises in response to the audio signal in the specific audio content format comprises an object-based audio representation signal, acquiring a reverberation relevant signal of the object-based audio representation signal based on reverberation parameters in the relevant parameters of the object-based audio representation signal, or, wherein the audio signal encoding step further comprises, in response to the audio signal in the specific audio content format comprises a scene-based audio representation signal, weighting the scene-based audio representation signal based on weight information in the relevant parameters of the scene-based audio representation signal, or, wherein the audio signal encoding step further comprises, in response to the audio signal in the specific audio content format comprises a scene-based audio representation signal, performing a sound field rotation operation on the scene-based audio representation signal based on the rotation information indicated in the relevant parameters of the scene-based audio representation signal, or, wherein the audio signal encoding step further comprises, in response to the audio signal in the specific audio content format comprises a specific type of channel signal in the channel-based audio representation signal, converting the specific type of channel signal into an object-based audio representation signal and then encoding it, or, wherein the audio signal encoding step further comprises, in response to the audio signal in the specific audio content format comprises a specific type of channel signal in the channel-based audio representation signal, splitting the specific type of channel signal into audio elements by channel and converting them into metadata for encoding.

12. The audio rendering method of claim 9, wherein the audio signal decoding step further comprises spatially decoding an audio signal that has not spatially encoded, wherein the audio signal that has not spatially encoded comprises at least one of a scene-based audio representation signal, a specific type of channel signal in a channel-based audio representation signal, and a reverberated audio signal.

13. The audio rendering method of claim 9, wherein the audio signal decoding step further comprises, in a speaker playback mode, spatially decoding the audio signal to be decoded by using a decoding matrix corresponding to speaker configuration, wherein, the decoding matrix comprises at least one of the following:

in response to playbacking by a predetermined speaker array, the decoding matrix is a decoding matrix built in an audio rendering system or audio signal decoding module or a decoding matrix received from the outside and corresponding to the predetermined speaker array, or in response to playbacking by a custom speaker array, the decoding matrix is calculated according to arrangement manner of the custom speaker array.

14. The audio rendering method of claim 13, wherein the decoding matrix is calculated according to azimuth angle and pitch angle of each speaker in the speaker array or three-dimensional coordinate values of the speaker.

15. The audio rendering method of claim 9, wherein the audio signal decoding step further comprises, in a binaural playback mode, directly decoding an audio signal into a binaural signal as a decoded audio signal or performing speaker virtualization to obtain a decoded signal as a decoded audio signal, or, wherein the audio signal decoding step further comprises, in a binaural playback mode, converting the audio signal to be decoded by using a rotation matrix based on the listener's posture, and performing frequency domain convolution on each signal channel to obtain a decoded audio signal, or, wherein the audio signal decoding step further comprises performing a sound field rotation operation on the audio signal based on rotation information in the relevant parameters.

16. The audio rendering method of claim 9, further comprising a signal post-processing step of post-processing the decoded audio signal.

17. An electronic apparatus, comprising:

a memory, and a processor coupled to the memory; the processor is configured to, based on instructions stored in the memory, execute the following steps:

an audio information processing step of acquiring relevant parameters of an audio signal in a specific audio content format based on metadata associated with the audio signal in the specific audio content format, wherein the audio signal in the specific audio content format comprises at least one of an object-based audio representation signal, a scene-based audio representation signal, or a channel-based audio representation signal;

an audio signal encoding step of spatially encoding the audio signal in the specific audio content format based on the relevant parameters of the audio signal in the specific audio content format to obtain a spatially encoded audio signal in a common spatial format, wherein the spatially encoded audio signal is an Ambisonics type of audio signal, wherein the audio signal encoding step further comprises, in response to the audio signal in the specific audio content format comprising the object-based audio representation signal, spatially encoding the object-based audio representation signal based on spatial attribute information in relevant parameters of the object-based audio representation signal, wherein the spatial attribute information of the object-based audio representation signal comprises information related to a spatial propagation path of a sound object of the audio signal to a listener, which comprises at least one of propagation duration, propagation distance, azimuth information, path energy intensity and nodes along the way of the spatial propagation path of the sound object to the listener; and an audio signal decoding step of spatially decoding the encoded audio signal to obtain a decoded audio signal for audio rendering.

18. The electronic apparatus of claim 17, wherein the spatially encoded audio signal comprises at least one of First Order Ambisonics (FOA), Higher Order Ambisonics (HOA) and Mixed-Order Ambisonics (MOA).

* * * * *